US012782686B2

(12) United States Patent
Chen et al.

(10) Patent No.: US 12,782,686 B2
(45) Date of Patent: Nov. 3, 2026

(54) OPTICAL IMAGING SYSTEM

(71) Applicant: Zhejiang Sunny Optics Co., Ltd, Yuyao City (CN)

(72) Inventors: Li Chen, Yuyao City (CN); Shuang Zhang, Yuyao City (CN); Rongbo Fang, Yuyao City (CN); Xiaobin Zhang, Yuyao City (CN); Jianke Wenren, Yuyao City (CN); Fujian Dai, Yuyao City (CN); Liefeng Zhao, Yuyao City (CN)

(73) Assignee: Zhejiang Sunny Optics Co., Ltd, Yuyao City (CN)

( * ) Notice: Subject to any disclaimer, the term of this patent is extended or adjusted under 35 U.S.C. 154(b) by 665 days.

(21) Appl. No.: 18/296,956

(22) Filed: Apr. 6, 2023

(65) Prior Publication Data

US 2023/0244064 A1 Aug. 3, 2023

(30) Foreign Application Priority Data

Apr. 28, 2022 (CN) ......................... 202210462097.2

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
CPC ...... G02B 13/0045; G02B 13/18; G02B 9/64; G02B 7/021
USPC ......................................... 359/708, 755, 808
See application file for complete search history.

(56) References Cited

U.S. PATENT DOCUMENTS

2022/0404262 A1* 12/2022 Nagae ................ G01N 15/1459

FOREIGN PATENT DOCUMENTS

| | | | |
|---|---|---|---|
| CN | 104950424 | A | 9/2015 |
| CN | 107621681 | A | 1/2018 |
| CN | 112198630 | A | 1/2021 |
| CN | 112731625 | A | 4/2021 |
| CN | 113296233 | A | 8/2021 |
| CN | 218068414 | U | 12/2022 |

OTHER PUBLICATIONS

Chinese Examination Notice corresponding to application 202210462097.2, dated Aug. 6, 2025, 12 pages.

* cited by examiner

*Primary Examiner* — Angela M. Medich
(74) *Attorney, Agent, or Firm* — Reising Ethington P.C.

(57) ABSTRACT

An optical imaging system, including: a lens barrel structure, including a first lens barrel and a subsequent lens barrel that are arranged sequentially along an optical axis from an object side to an image side; an imaging lens group, including a first lens, a second lens, a third lens, a fourth lens, a fifth lens, a sixth lens and a seventh lens that are arranged sequentially along the optical axis from the object side to the image side; and a plurality of spacing elements, including a second spacing element that is at least partially in contact with an image-side surface of the second lens and a third spacing element that is at least partially in contact with an image-side surface of the third lens.

16 Claims, 9 Drawing Sheets

OPTICAL IMAGING SYSTEM

CROSS-REFERENCE TO RELATED APPLICATIONS

This application claims benefit of priority to Chinese Patent Application No. 202210462097.2 filed on Apr. 28, 2022 before the China National Intellectual Property Administration, the entire disclosure of which is incorporated herein by reference in its entity.

TECHNICAL FIELD

The present disclosure relates to the field of optical element, and specifically to an optical imaging system.

BACKGROUND

As the customer market has higher and higher requirements on the appearance of mobile phones, the number of imaging lens assemblies installed on the mobile phones is increasing, and the occupied space of a single lens assembly is getting smaller and smaller, the miniaturization of modules has gradually become the goal pursued by lens assembly suppliers together with module factories.

SUMMARY

Embodiments of the present disclosure provide an optical imaging system, including: a lens barrel structure, including a first lens barrel and a subsequent lens barrel that are arranged sequentially along an optical axis from an object side to an image side; an imaging lens group, including a first lens, a second lens, a third lens, a fourth lens, a fifth lens, a sixth lens and a seventh lens that are arranged sequentially along the optical axis from the object side to the image side; and a plurality of spacing elements, including a second spacing element that is at least partially in contact with an image-side surface of the second lens and a third spacing element that is at least partially in contact with an image-side surface of the third lens. At least one lens in the imaging lens group is arranged in the first lens barrel, and a peripheral portion of the at least one lens in the imaging lens group is at least partially in contact with an inner wall of the lens barrel structure; and an inner diameter d3s of an object-side surface of the third spacing element, an outer diameter D3s of the object-side surface of the third spacing element, a radius of curvature R3 of an object-side surface of the second lens, a radius of curvature R4 of the image-side surface of the second lens, a spacing EP23 between the second spacing element and the third spacing element along the optical axis, an air spacing T23 between the second lens and the third lens on the optical axis and a center thickness CT3 of the third lens on the optical axis satisfy: $d3s/R3+D3s/R4+EP23/(T23+CT3)>1.0$.

In an embodiment, each spacing element in the plurality of spacing elements has a first surface parallel to the optical axis and a second surface perpendicular to the optical axis, at least one first surface is at least partially in contact with the inner wall of the lens barrel structure, and at least one second surface is at least partially in contact with a lens in the imaging lens group.

In an embodiment, an object-side surface of the seventh lens is a concave surface, and the seventh lens and the sixth lens have opposite refractive powers.

In an embodiment, the sixth lens has a positive refractive power, and the seventh lens has a negative refractive power.

In an embodiment, in object-side surfaces and image-side surfaces of the first lens, the second lens and the third lens, at least two surfaces are convex surfaces, at least two surfaces are concave surfaces, and at least one image-side surface is a concave surface.

In an embodiment, the object-side surface of the second lens is a convex surface.

In an embodiment, the image-side surface of the third lens is a concave surface.

In an embodiment, the subsequent lens barrel is composed of one lens barrel or two lens barrels, a lens closest to the image side is arranged inside a lens barrel closest to the image side in the subsequent barrel, and a peripheral portion of an object-side surface of the lens closest to the image side is at least partially in contact with an inner wall of the lens barrel closest to the image side in the subsequent barrel.

In an embodiment, the subsequent lens barrel is composed of one lens barrel or two lens barrels, a lens closest to the image side is placed outside a lens barrel closest to the image side in the subsequent barrel, and a peripheral portion of an object-side surface of the lens closest to the image side is in connection with a rear-end surface of the lens barrel closest to the image side in the subsequent barrel by any one of glue, buckles or screw thread.

In an embodiment, a center thickness CT1 of the first lens on the optical axis, a center thickness CT2 of the second lens on the optical axis, an outer diameter D2s of an object-side surface of the second spacing element, an inner diameter d2s of the object-side surface of the second spacing element and a spacing EP02 between an inner wall of the first lens barrel perpendicular to the optical axis and the object-side surface of the second spacing element on the optical axis satisfy: $1.0<(D2s-d2s)/EP02+CT1/CT2<10.0$.

In an embodiment, an outer diameter D0s of a front-end surface of the first lens barrel facing the object side, a minimal inner diameter ds of a front-end portion of the first lens barrel facing the object side, a length L1 from the front-end surface of the first lens barrel to a rear-end surface of the first lens barrel on the optical axis, a radius of curvature R1 of an object-side surface of the first lens and a radius of curvature R2 of an image-side surface of the first lens satisfy: $(D0s-ds)/(2\times L1)/(R1/R2)>0.5$.

In an embodiment, the subsequent lens barrel at least includes a second lens barrel close to the rear-end surface of the first lens barrel, where a radial distance B02 of a front-end surface of the second lens barrel perpendicular to the optical axis, a center thickness CT2 of the second lens on the optical axis, a maximal thickness CP2 of the second spacing element and a spacing EP022 between an inner wall of the second lens barrel perpendicular to the optical axis and the second spacing element along the optical axis satisfy: $1.0<B02/CT2+CP2/EP022<10.0$.

In an embodiment, a center thickness CT1 of the first lens on the optical axis, an air spacing T12 between the first lens and the second lens on the optical axis, a maximal diameter DP1 of the first lens and a radial distance B01 of the rear-end surface of the first lens barrel in a direction perpendicular to the optical axis satisfy: $(CT1+T12)/DP1+B01/CT1>0.3$.

In an embodiment, a maximal diameter DP6 of the sixth lens, a maximal diameter DP7 of the seventh lens, an air spacing T67 between the sixth lens and the seventh lens on the optical axis and a center thickness CT7 of the seventh lens on the optical axis satisfy: $(DP7-DP6)/(T67+CT7)>0.5$.

In an embodiment, the subsequent lens barrel at least includes a second lens barrel close to a rear-end surface of the first lens barrel, and a length L2 from a front-end surface of the second lens barrel to a rear-end surface of the second lens barrel along the optical axis and a maximal total length L of the lens barrel structure satisfy: L2/L>0.1.

In an embodiment, the plurality of spacing elements further comprise: a fourth spacing element that is at least partially in contact with an image-side surface of the fourth lens and a fifth spacing element that is at least partially in contact with an image-side surface of the fifth lens, where a spacing EP34 between the third spacing element and the fourth spacing element along the optical axis, a spacing EP45 between the fourth spacing element and the fifth spacing element along the optical axis, a center thickness CT4 of the fourth lens on the optical axis and a center thickness CT5 of the fifth lens on the optical axis satisfy: EP34/CT4+EP45/CT5>0.5.

In an embodiment, the subsequent lens barrel at least includes a second lens barrel close to a rear-end surface of the first lens barrel, and the rear-end surface of the first lens barrel and a front-end surface of the second lens barrel have a gap or form a bonding structure, where a length L1 from a front-end surface of the first lens barrel to the rear-end surface of the first lens barrel along the optical axis, a length L2 from the front-end surface of the second lens barrel to a rear-end surface of the second lens barrel along the optical axis and a maximal total length L of the lens barrel structure satisfy: (L1+L2)/L>0.2.

BRIEF DESCRIPTION OF THE DRAWINGS

After reading detailed descriptions of non-limiting embodiments given with reference to the following accompanying drawings, other features, objectives and advantages of the present disclosure will become more apparent.

DETAILED DESCRIPTION OF EMBODIMENTS

Figure 1:
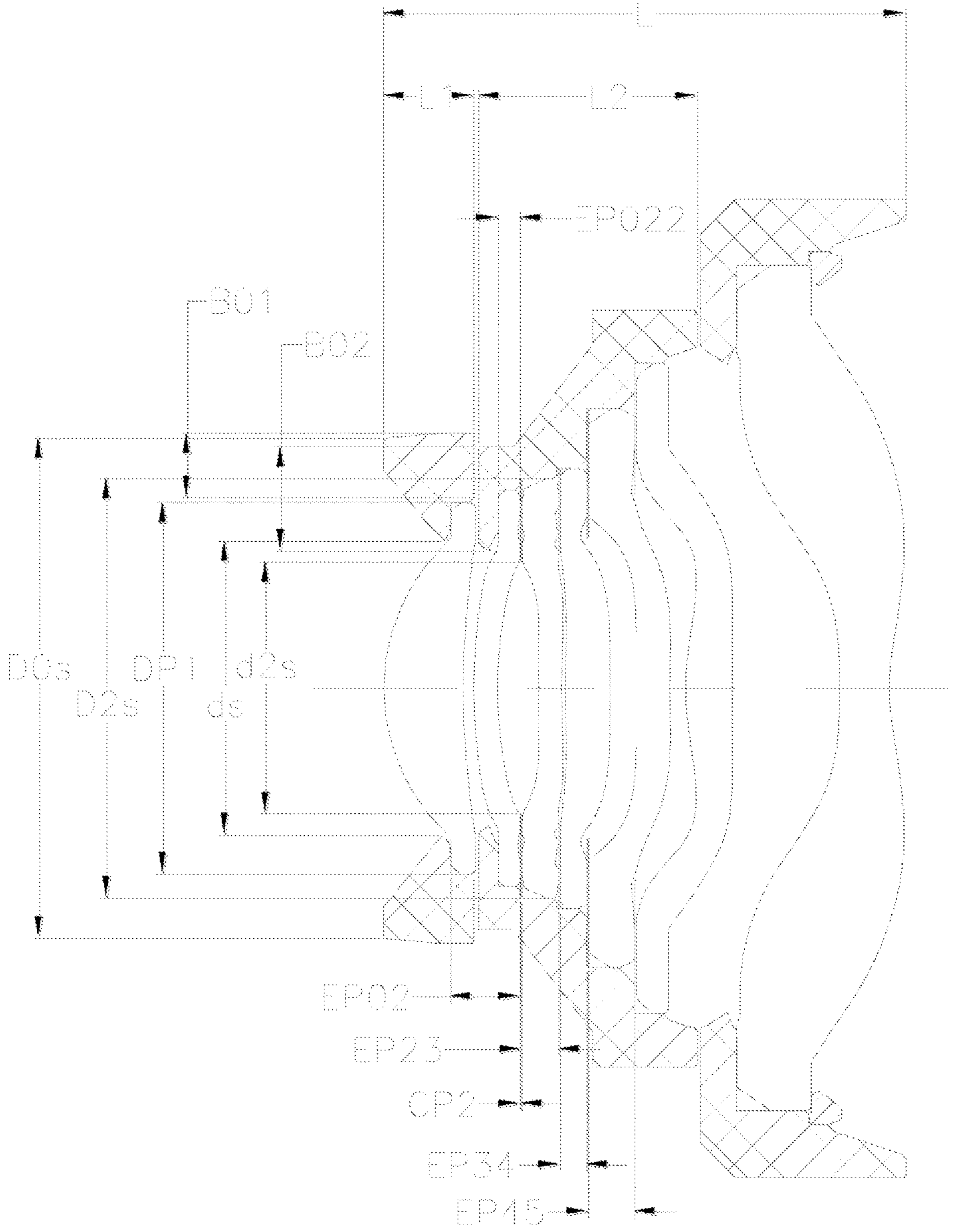
FIG. 1 is a structural layout diagram of an optical imaging system according to the present disclosure and a schematic diagram of some parameters.

For a better understanding of the present disclosure, various aspects of the present disclosure will be described in more detail with reference to the accompanying drawings. It should be understood that the detailed description is merely an illustration for the exemplary implementations of the present disclosure, rather than a limitation to the scope of the present disclosure in any way. Throughout the specification, the same reference numerals designate the same elements. The expression "and/or" includes any and all combinations of one or more of the associated listed items.

It should be noted that, in the specification, the expressions such as "first," "second" and "third" are only used to distinguish one feature from another, rather than represent any limitations to the features. Thus, the first lens discussed below may also be referred to as the second lens or the third lens without departing from the teachings of the present disclosure.

In the accompanying drawings, the thicknesses, sizes and shapes of the lenses are slightly exaggerated for the convenience of explanation. Specifically, the shapes of spherical surfaces or aspheric surfaces shown in the accompanying drawings are shown by examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, a paraxial area refers to an area near an optical axis. If a lens surface is a convex surface and the position of the convex surface is not defined, it represents that the lens surface is a convex surface at least at the paraxial area. If the lens surface is a concave surface and the position of the concave surface is not defined, it represents that the lens surface is a concave surface at least at the paraxial area. The determination for the surface shape at the paraxial area may be according to the determination approach of those of ordinary skill in the art, in which whether the surface is concave or convex is determined according to whether the R value (R refers to a radius of curvature at the paraxial area) is positive or negative. A surface of each lens that is closest to a photographed object is referred to as the object-side surface of the lens, and a surface of the each lens that is closest to an image plane is referred to as the image-side surface of the lens. For the object-side surface, it is determined that the object-side surface is a convex surface when the R value is positive, and it is determined that the object-side surface is a concave surface when the R value is negative. For the image-side surface, it is determined that the image-side surface is a concave surface when the R value is positive, and it is determined that the image-side surface is a convex surface when the R value is negative.

It should be further understood that the terms "comprise," "comprising," "having," "include" and/or "including," when used in the specification, specify the presence of stated features, elements and/or components, but do not exclude the presence or addition of one or more other features, elements, components and/or combinations thereof. In addition, expressions such as "at least one of," when preceding a list of listed features, modify the entire list of features rather than an individual element in the list. Further, the use of "may," when describing the implementations of the present disclosure, represents "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms (e.g., those defined in commonly used dictionaries) should be interpreted as having a meaning that is consistent with their meaning in the context of the relevant art and will not be interpreted in an idealized or overly formal sense unless expressly so defined herein.

It should be noted that embodiments in the present disclosure and features in the embodiments may be combined with each other on a non-conflict basis. The following embodiments only express several implementations of the present disclosure, and the description thereof is specific and detailed, but should not be construed as a limitation to the patent scope of the present disclosure. It should be noted that those skilled in the art can make several variations and improvements without departing from the concept of the present disclosure, and these variations and improvements all fall into the scope of protection of the present disclosure. For example, the imaging lens groups, the lens barrel structures and the spacing elements in the embodiments of the present disclosure can be combined arbitrarily, and it is not limited that the imaging lens group in one embodiment can only be combined with the lens barrel structure, the spacing element, etc. in this embodiment.

The present disclosure will be described below in detail with reference to the accompanying drawings and in combination with the embodiments. FIG. 1 is a structural layout diagram of an optical imaging system according to the present disclosure and a schematic diagram of some parameters. It should be understood by those skilled in the art that some parameters (e.g., the center thickness CT1 of the first lens on the optical axis) frequently used in the art are not shown in FIG. 1, and FIG. 1 only shows some parameters of an optical imaging system according to the present disclosure by examples, for a better understanding of the present disclosure.

The optical imaging system according to exemplary implementations of the present disclosure may include a lens barrel structure, an imaging lens group and a plurality of spacing elements. Here, the lens barrel structure is a split-type barrel, which may include a first lens barrel and a subsequent lens barrel that are arranged sequentially along the optical axis from an object side to an image side, and each lens barrel has a front-end surface and a rear-end surface. The imaging lens group may include a first lens, a second lens, a third lens, a fourth lens, a fifth lens, a sixth lens and a seventh lens that are arranged sequentially along the optical axis from the object side to the image side. Here, at least one lens in the imaging lens group is arranged in the first lens barrel, and a peripheral portion of the at least one lens in the imaging lens group is at least partially in contact with an inner wall of the lens barrel structure. The flexible configuration of the lens barrel helps the optical imaging system to adapt to the requirements of modules of various sizes, making the design of the optical imaging system more popular. Meanwhile, the optical imaging system according to the present disclosure is provided with a plurality of spacing elements therein to improve the strength of the optical imaging system, which can reduce stray light. Accordingly, the above optical imaging system according to the present disclosure has at least one beneficial effect such as a high imaging quality, less stray light, and good system stability.

In the exemplary implementations, the plurality of spacing elements of the optical imaging system according to the present disclosure include a second spacing element that is at least partially in contact with an image-side surface of the second lens and a third spacing element that is at least partially in contact with an image-side surface of the third lens. The optical imaging system according to the present disclosure may satisfy: d3*s*/R3+D3*s*/R4+EP23/(T23+CT3)>1.0. Here, d3*s* is an inner diameter of an object-side surface of the third spacing element, D3*s* is an outer diameter of the object-side surface of the third spacing element, R3 is a radius of curvature of an object-side surface of the second lens, R4 is a radius of curvature of the image-side surface of the second lens, EP23 (see FIG. 1) is a spacing between the second spacing element and the third spacing element along the optical axis, T23 is an air spacing between the second lens and the third lens on the optical axis, and CT3 is a center thickness of the third lens on the optical axis. More specifically, d3*s*, R3, D3*s*, R4, EP23, T23 and CT3 may further satisfy: d3*s*/R3+D3*s*/R4+EP23/(T23+CT3)>2.18. Satisfying d3*s*/R3+D3*s*/R4+EP23/(T23+CT3)>1.0 is conducive to controlling the width of the second spacing element to ensure the blocking between the second lens and the third lens. The larger the blocking area is, the more the blocked reflected light is, which is helpful for the overall improvement of the stray light of the lens assembly.

In the exemplary implementations, an object-side surface of the seventh lens of the optical imaging system according to the present disclosure is a concave surface, and the seventh lens and the sixth lens have opposite refractive powers, which plays the role of diverging the light and which is conducive to the smooth transmission of the light to improve the stability of the system. The seventh lens has a concave object-side surface, which is conducive to reducing the influence of the surface on spherical aberrations, coma and astigmatism.

In the exemplary implementations, the sixth lens of the optical imaging system according to the present disclosure has a positive refractive power, and the seventh lens has a negative refractive power.

The optical imaging system according to the exemplary implementations of the present disclosure further includes the plurality of spacing elements. Each of the plurality of spacing elements has a first surface parallel to the optical axis and a second surface perpendicular to the optical axis. Here, at least one first surface is at least partially in contact with the inner wall of the lens barrel structure, and at least one second surface is at least partially in contact with a lens in the imaging lens group. By reasonably arranging the positions of the spacing elements, the generation of stray light of the lens assembly is reduced.

In the exemplary implementations, the optical imaging system according to the present disclosure may satisfy: (CT1+T12)/DP1+B01/CT1>0.3. Here, CT1 is a center thickness of the first lens on the optical axis, T12 is an air spacing between the first lens and the second lens on the optical axis, DP1 is a maximal diameter of the first lens, and B01 is a radial distance of the rear-end surface of the first lens barrel in a direction perpendicular to the optical axis. For DP1 and B01, reference may be made to FIG. 1. Also, CT1, T12, DP1 and B01 are values in units of millimeters (mm). More specifically, CT1, T12, DP1 and B01 may further satisfy: (CT1+T12)/DP1+B01/CT1>0.48. Controlling the sizes of CT1 and T12 is conducive to meeting the structural requirements for the molding of the subsequent lens barrel. The thickness that the front-end surface of the subsequent lens barrel bears is required to be larger than 0.28 mm to ensure the integrity of injection molding. Controlling the size of B01 is conducive to controlling the matching approach of the first lens barrel and the subsequent lens barrel. Adjusting the air spacing between the first lens and the second lens on the optical axis helps to compensate the variation of the field curvature of the lens assembly, thereby improving the imaging quality of the optical imaging system.

In the exemplary implementations, the plurality of spacing elements of the optical imaging system according to the present disclosure may include the second spacing element that is at least partially in contact with the image-side surface of the second lens. The optical imaging system according to the present disclosure may satisfy: $1.0<(D2s-d2s)/EP02+CT1/CT2<10.0$. Here, CT1 is the center thickness of the first lens on the optical axis, CT2 is a center thickness of the second lens on the optical axis, D2*s* is an outer diameter of an object-side surface of the second spacing element, d2*s* is an inner diameter of the object-side surface of the second spacing element, and EP02 is a spacing between an inner wall of the first lens barrel perpendicular to the optical axis and the object-side surface of the second spacing element on the optical axis. For D2*s*, d2*s* and EP02, reference may be made to FIG. 1. More specifically, D2*s*, d2*s*, EP02, CT1 and CT2 may further satisfy: $3.65<(D2s-d2s)/EP02+CT1/CT2<6.62$. Satisfying $1.0<(D2s-d2s)/EP02+CT1/CT2<10.0$ is conducive to improving the assembling stability of the lens at the front end, thereby improving the problem of low yield due to the amount of matching. At the same time, it helps to reasonably distribute the refractive power to improve the imaging quality of the optical imaging system. Moreover, it is conducive to ensuring the molding and reasonable sequence of the imaging lens group and the lens barrel structure, thereby ensuring the assembling stability of the imaging lens group.

In the exemplary implementations, the optical imaging system according to the present disclosure may satisfy: $(D0s-ds)/(2\times L1)/(R1/R2)>0.5$. Here, referring to FIG. 1, D0*s* is an outer diameter of a front-end surface of the first lens barrel facing the object side, ds is a minimal inner diameter of a front-end portion of the first lens barrel facing the object side, L1 is a length from the front-end surface of the first lens barrel to a rear-end surface of the first lens barrel on the optical axis, R1 is a radius of curvature of an object-side surface of the first lens, and R2 is a radius of curvature of an image-side surface of the first lens. More specifically, D0*s*, ds, L1, R1 and R2 may further satisfy: $(D0s-ds)/(2\times L1)/(R1/R2)>1.89$. Satisfying $(D0s-d0s)/(2\times L1)/(R1/R2)>0.5$ is conducive to meeting the appearance control requirement of the optical imaging system. Specifically, the head size of the optical imaging system can be controlled by controlling D0*s*, which is conducive to the calculation for the windowing design of the module. The length of the first lens barrel and the degree of wrapping the first lens by the first lens barrel can be controlled by controlling L1, which is conducive to adjusting the matching approach and matching size of the first lens barrel and the subsequent lens barrel. The larger the length of the first lens barrel is, the better the stability of the optical imaging system, thereby further improving the imaging quality of the optical imaging system.

In the exemplary implementations, the plurality of spacing elements of the optical imaging system according to the present disclosure include the second spacing element that is at least partially in contact with the image-side surface of the second lens. The subsequent lens barrel at least includes a second lens barrel close to the rear-end surface of the first lens barrel. The optical imaging system according to the present disclosure may satisfy: $1.0<B02/CT2+CP2/EP022<10.0$. Here, as shown in FIG. 1, B02 is a radial distance of a front-end surface of the second lens barrel perpendicular to the optical axis, EP022 is a spacing between an inner wall of the second lens barrel perpendicular to the optical axis and the second spacing element along the optical axis, CT2 is the center thickness of the second lens on the optical axis, and CP2 is a maximal thickness of the second spacing element. More specifically, B02, CT2, CP2 and EP022 may further satisfy: $3.73<B02/CT2+CP2/EP022<5.55$. Satisfying $1.0<B02/CT2+CP2/EP022<10.0$ is conducive to controlling the thickness of the front-end surface of the second lens barrel. The larger the size is, the larger the thickness of the front end of the lens barrel is, and the better the stability of the assembling of the second lens and the subsequent lens is.

In the exemplary implementations, the optical imaging system according to the present disclosure may satisfy: $(DP7-DP6)/(T67+CT7)>0.5$. Here, DP6 is a maximal diameter of the sixth lens, DP7 is a maximal diameter of the seventh lens, T67 is an air spacing between the sixth lens and the seventh lens on the optical axis, and CT7 is a center thickness of the seventh lens on the optical axis. More specifically, DP7, DP6, T67 and CT7 may further satisfy: $0.93<(DP7-DP6)/(T67+CT7)<1.53$. Satisfying $(DP7-DP6)/(T67+CT7)>0.5$ is conducive to confirming the matching approach of the sixth lens and the seventh lens, and thus, the fixing approach of the sixth lens and the lens barrel where the sixth lens is can be controlled. The larger the difference between the maximal diameters of the sixth lens and the seventh lens is, the more the fixing approaches are, and the better the fixing stability is.

In the exemplary implementations, the subsequent lens barrel at least includes the second lens barrel close to the rear-end surface of the first lens barrel. The optical imaging system according to the present disclosure may satisfy: $L2/L>0.1$. Here, as shown in FIG. 1, L2 is a length from the front-end surface of the second lens barrel to a rear-end surface of the second lens barrel along the optical axis, and L is a maximal total length (i.e., the distance from the front-end surface of the first lens barrel to the rear-end surface of a lens barrel closest to the image side in the subsequent lens barrel on the optical axis) of the lens barrel structure. L2 and L may further satisfy: $0.37<L2/L<1.0$. Satisfying $L2/L>0.1$ is conducive to distinguishing the difference in the outer contour of the entire lens barrel structure, to effectively control the matching of the lens assembly and the module. By reasonably arranging the position of the spacing element, the generation of stray light of the lens assembly is reduced. At the same time, the larger L2 is, the larger the spacing distance between the first lens and the last lens on the optical axis is, and the larger the length of the entire lens assembly is. Controlling L2 is conducive to achieving the miniaturization of the entire lens assembly.

In the exemplary implementations, the plurality of spacing elements of the optical imaging system according to the present disclosure include the third spacing element that is at least partially in contact with the image-side surface of the third lens, a fourth spacing element that is at least partially in contact with an image-side surface of the fourth lens, and a fifth spacing element that is at least partially in contact with an image-side surface of the fifth lens. The optical imaging system according to the present disclosure may satisfy: $EP34/CT4+EP45/CT5>0.5$. Here, as shown in FIG. 1, EP34 is a spacing between the third spacing element and the fourth spacing element along the optical axis, EP45 is a spacing between the fourth spacing element and the fifth spacing element along the optical axis, CT4 is a center thickness of the fourth lens on the optical axis, and CT5 is a center thickness of the fifth lens on the optical axis. More specifically, EP34, CT4, EP45 and CT5 may further satisfy:

1.55<EP34/CT4+EP45/CT5<3.6. Satisfying EP34/CT4+EP45/CT5>0.5 is conducive to controlling the thicknesses of the third lens and the fourth lens to control the matching approach of the third lens and the fourth lens. The larger EP34 is, the easier the selection for a spacing element is, and the larger the room for improvement of stray light is, which is conducive to improving the quality of overall stray light of the optical imaging system.

In the exemplary implementations, the subsequent lens barrel of the optical imaging system according to the present disclosure at least includes the second lens barrel close to the rear-end surface of the first lens barrel. The rear-end surface of the first lens barrel and the front-end surface of the second lens barrel have a gap or form a bonding structure. The optical imaging system according to the present disclosure may satisfy: (L1+L2)/L>0.2. Here, as shown in FIG. 1, L1 is the length from the front-end surface of the first lens barrel to the rear-end surface of the first lens barrel along the optical axis, L2 is the length from the front-end surface of the second lens barrel to a rear-end surface of the second lens barrel along the optical axis, and L is the maximal total length (i.e., the distance from the front-end surface of the first lens barrel to the rear-end surface of the lens barrel closest to the image side in the subsequent lens barrel on the optical axis) of the lens barrel structure. More specifically, L1, L2 and L may further satisfy: 0.5<(L1+L2)/L<1.2. Satisfying (L1+L2)/L>0.2 is conducive to distinguishing the difference in the outer contour of the entire lens barrel structure, and thus can effectively control the matching of the lens assembly and the module. At the same time, controlling the size can control the thickness of the final lens and a light extinction approach, which is of great benefit for the improvement of the stray light of the lens assembly.

In the exemplary implementations, the subsequent lens barrel of the optical imaging system according to the present disclosure is composed of one lens barrel or two lens barrels. A lens closest to the image side is arranged inside the lens barrel closest to the image side in the subsequent barrel, and a peripheral portion of an object-side surface of the lens closest to the image side is at least partially in contact with an inner wall of the lens barrel closest to the image side in the subsequent barrel. It is conducive to distinguishing the difference in appearance and the size of the diameter of the lens closest to the image side. Whether the lens closest to the image side is included inside the lens barrel affects the combination approach of the lens closest to the image side and the lens group in the front part, as well as the maximal outer diameter of the entire lens assembly. The flexible configuration of the lens barrel helps the lens assembly to adapt to the requirements of modules of various sizes, making the design of the lens assembly more popular. Reducing the maximal outer diameter of the lens assembly can allow the use of miniaturized modules to achieve the lightweight design.

In the exemplary implementations, the subsequent lens barrel of the optical imaging system according to the present disclosure is composed of one lens barrel or two lens barrels. The lens closest to the image side is placed outside the lens barrel closest to the image side in the subsequent barrel, and the peripheral portion of the object-side surface of the lens closest to the image side is in connection with a rear-end surface of the lens barrel closest to the image side in the subsequent barrel by any one of glue, buckles or screw thread. The matching of the lens closest to the image side and the previous lens includes, but not limited to, a plurality of matching approaches such as glue, buckles and screw thread. The gap between the lens closest to the image side and the previous lens group is differently affected according to the machining precision of a buckle and screw thread and the amount of dispensed glue. The higher the precision is, the better the overall performance of the lens assembly is.

In the exemplary implementations, the subsequent lens barrel of the optical imaging system according to the present disclosure includes a second lens barrel and a third lens barrel. Here, the second lens barrel is arranged between the first lens barrel and the third lens barrel.

In the exemplary implementations, the number of lenses having a refractive power in the imaging lens group of the optical imaging system according to the present disclosure is seven. In object-side surfaces and image-side surfaces of the first lens, the second lens and the third lens, at least two surfaces are convex surfaces, at least two surfaces are concave surfaces, and at least one image-side surface is a concave surface. Such setting for the surface shape is conducive to ensuring the imaging requirement of the lens assembly having a large image plane. Here, the convex lens is mainly to ensure the luminous flux of the lens assembly, and the concave lens is mainly to ensure the light convergence and imaging by adjusting the direction of the light. The combination of a plurality of convex surfaces and a plurality of concave surfaces is conducive to improving the imaging effect of the optical imaging system.

In the exemplary implementations, the object-side surface the second lens of the optical imaging system according to the present disclosure is a convex surface, and the image-side surface of the third lens is a concave surface.

In the exemplary implementations, an effective focal length f of the optical imaging lens assembly may be, for example, in the range from 6.19 mm to 6.70 mm. An effective focal length f1 of the first lens may be, for example, in the range from 7.80 mm to 12.45 mm. An effective focal length f2 of the second lens may be, for example, in the range from −88.77 mm to 24.65 mm. An effective focal length f3 of the third lens may be, for example, in the range from −171.99 mm to −20.65 mm. An effective focal length f4 of the fourth lens may be, for example, in the range from −59.89 mm to 27.86 mm. An effective focal length f5 of the fifth lens may be, for example, in the range from −32.73 mm to −15.43 mm. An effective focal length f6 of the sixth lens may be, for example, in the range from 4.59 mm to 7.97 mm. An effective focal length f7 of the seventh lens may be, for example, in the range from −6.39 mm to −4.82 mm. The optical imaging lens assembly according to the present disclosure can have a small total track length in the case of having a large image plane, for example, the total track length TTL of the optical imaging lens assembly may satisfy: 8.13 mm<TTL<8.43 mm.

In the exemplary implementations, half of a diagonal length ImgH of an effective pixel area on the image plane satisfies: 6.21 mm<ImgH<6.34 mm.

In the exemplary implementations, a maximal field-of-view FOV of the optical imaging lens assembly satisfies: FOV>85°. As an example, the maximal field-of-view FOV of the optical imaging lens assembly may be, for example, in the range from 85.5° to 88.6°.

In the exemplary implementations, the optical imaging lens assembly according to the present disclosure may satisfy: f/EPD<1.62. Here, f is the effective focal length of the optical imaging lens assembly, and EPD is an entrance pupil diameter of the optical imaging lens assembly. As an example, f/EPD may be, for example, in the range from 1.56 to 1.62.

The optical imaging system according to the above implementations of the present disclosure may use a plurality of lenses, for example, the seven lenses described above. By reasonably distributing the refractive powers and the surface types of the lenses, the center thicknesses of the lenses, the axial spacings between the lenses, etc., the low-order aberration of the optical imaging system can be effectively balanced and controlled, and at the same time, the tolerance sensitivity of the optical imaging system can be reduced, and the miniaturization of the optical imaging system can be maintained.

In the implementations of the present disclosure, at least one of the surfaces of each of the first to seventh lenses is an aspheric surface. An aspheric lens is characterized in that the curvature continuously changes from the center of the lens to the periphery. Different from a spherical lens having a constant curvature from the center of the lens to the periphery, the aspheric lens has a better radius-of-curvature characteristic, and has advantages of improving the distortion aberration and the astigmatic aberration. The use of the aspheric lens can eliminate as much as possible the aberrations that occur during the imaging, thereby improving the imaging quality. Alternatively, the object-side surface and the image-side surface of each of the first to seventh lenses are aspheric surfaces.

However, it should be understood by those skilled in the art that the various results and advantages described in the present specification may be obtained by changing the number of the lenses constituting the optical imaging system without departing from the technical solution claimed by the present disclosure. For example, although the optical imaging system having seven lenses is described as an example in the implementations, the optical imaging system is not limited to including the seven lenses. If desired, the optical imaging system may also include other numbers of lenses.

Specific embodiments of the optical imaging system that may be applicable to the above implementations are further described below with reference to the accompanying drawings.

Embodiment 1

Figure 2A:
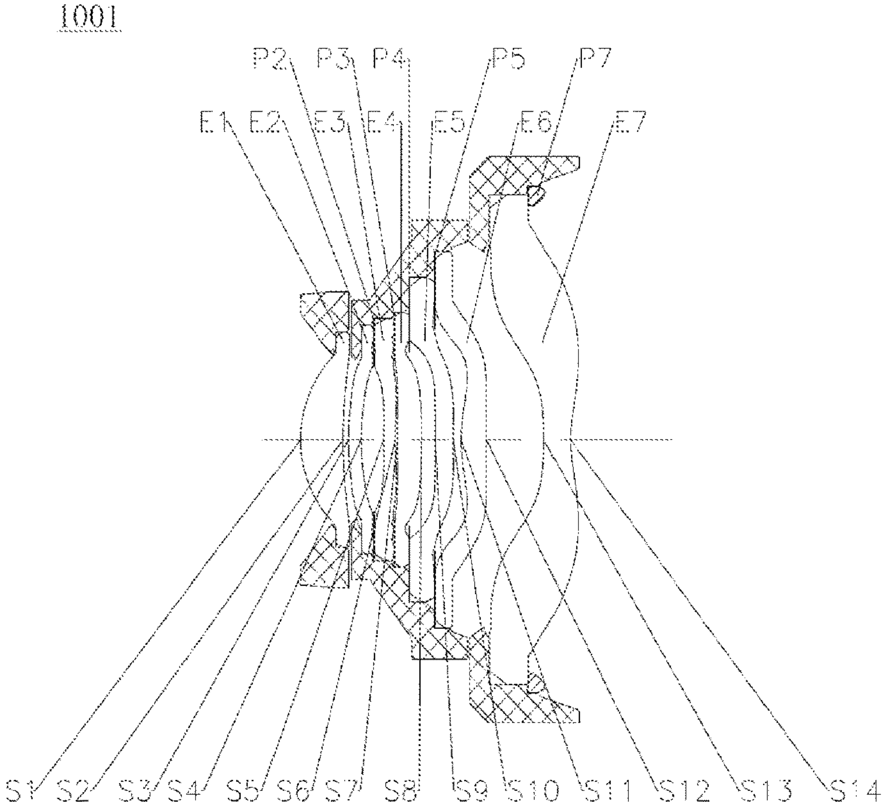
FIGS. 2A-2C are schematic structural diagrams of three optical imaging systems according to Embodiment 1 of the present disclosure.
Figure 2B:
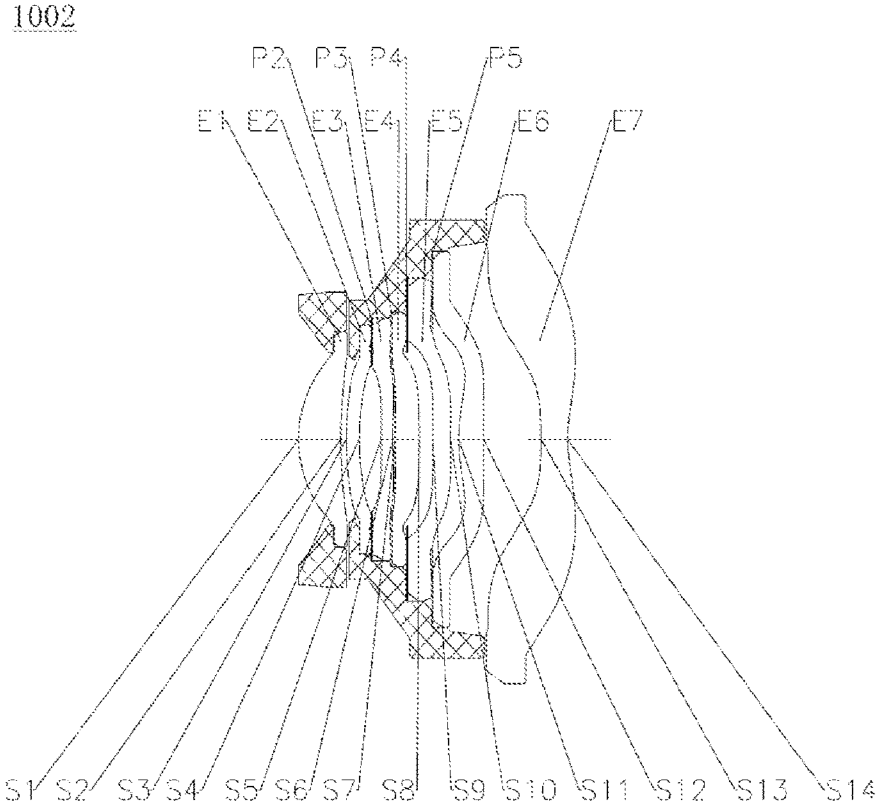
Figure 2C:
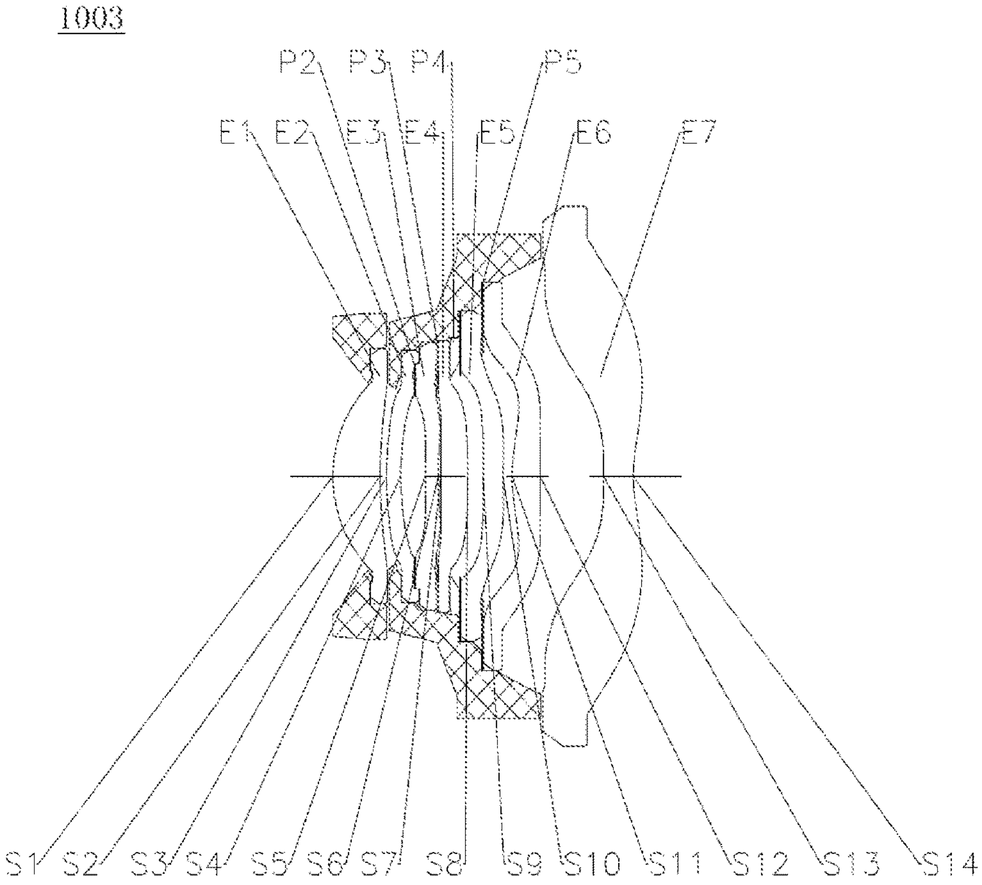

Optical imaging systems 1001, 1002 and 1003 according to Embodiment 1 of the present disclosure are described below with reference to FIGS. 2A-3C. FIGS. 2A-2C are respectively schematic structural diagrams of the optical imaging systems 1001, 1002 and 1003 according to Embodiment 1 of the present disclosure.

As shown in FIGS. 2A-2C, the optical imaging systems 1001, 1002 and 1003 respectively include a lens barrel structure, an imaging lens group and a plurality of spacing elements. Here, the lens barrel structure of the optical imaging system 1001 shown in FIG. 2A includes three lens barrels, which are respectively a first lens barrel closest to an object side, a second lens barrel, and a third lens barrel closest to an image side. The second lens barrel is located between the first lens barrel and the third lens barrel, there is a gap between the first lens barrel and the second lens barrel, and there is also a gap between the second lens barrel and the third lens barrel. The lens barrel structure of the optical imaging system 1002 shown in FIG. 2B and the lens barrel structure of the optical imaging system 1003 shown in FIG. 2C include two lens barrels, which are respectively a first lens barrel closest to the object side and a second lens barrel closest to the image side. There is a gap between the first lens barrel and the second lens barrel.

As shown in FIGS. 2A-2C, the optical imaging systems 1001, 1002 and 1003 adopt the same imaging lens group. The imaging lens groups of the optical imaging systems 1001, 1002 and 1003 respectively include a diaphragm STO (not shown), a first lens E1, a second lens E2, a third lens E3, a fourth lens E4, a fifth lens E5, a sixth lens E6 and a seventh lens E7 that are arranged in sequence along an optical axis from the object side to the image side. Here, the first lens E1 has a positive refractive power, an object-side surface S1 of the first lens E1 is a convex surface, and an image-side surface S2 of the first lens E1 is a concave surface. The second lens E2 has a negative refractive power, an object-side surface S3 of the second lens E2 is a convex surface, and an image-side surface S4 of the second lens E2 is a concave surface. The third lens E3 has a negative refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a convex surface. The fifth lens E5 has a negative refractive power, an object-side surface S9 of the fifth lens E5 is a convex surface, and an image-side surface S10 of the fifth lens E5 is a concave surface. The sixth lens E6 has a positive refractive power, an object-side surface S11 of the sixth lens E6 is a convex surface, and an image-side surface S12 of the sixth lens E6 is a convex surface. The seventh lens E7 has a negative refractive power, an object-side surface S13 of the seventh lens E7 is a concave surface, and an image-side surface S14 of the seventh lens E7 is a concave surface. Light from an object sequentially passes through the first to seventh lenses E1-E7 along the direction of a first optical axis, and finally forms an image on an image plane (not shown).

As shown in FIG. 2A, the plurality of spacing elements of the optical imaging system 1001 include a second spacing element P2, a third spacing element P3, a fourth spacing element P4, a fifth spacing element P5 and a seventh spacing element P7. Here, the second spacing element P2 is provided on the image-side surface of the second lens E2 and is at least partially in contact with the second lens E2. The third spacing element P3 is provided on the image-side surface of the third lens E3 and is at least partially in contact with the third lens E3. The fourth spacing element P4 is provided on the image-side surface of the fourth lens E4 and is at least partially in contact with the fourth lens E4. The fifth spacing element P5 is provided on the image-side surface of the fifth lens E5 and is at least partially in contact with the fifth lens E5. The seventh spacing element P7 is provided on the image-side surface e of the seventh lens E7 and is at least partially in contact with the seventh lens E7. In this embodiment, the second spacing element P2, the third spacing element P3, the fourth spacing element P4 and the fifth spacing element P5 are spacers, and the seventh spacing element P7 is a press ring. The above spacing elements P2-P5 and P7 can block the entry of excess light from the outside, make the lenses better supported against the lens barrels, and enhance the structural stability of the optical imaging system 1001.

As shown in FIGS. 2B and 2C, the plurality of spacing elements of the optical imaging system 1002 and the optical imaging system 1003 include a second spacing element P2, a third spacing element P3, a fourth spacing element P4 and a fifth spacing element P5. Here, the second spacing element P2 is provided on the image-side surface of the second lens E2 and is at least partially in contact with the second lens E2. The third spacing element P3 is provided on the image-side surface of the third lens E3 and is at least partially in contact with the third lens E3. The fourth spacing element P4 is provided on the image-side surface of the fourth lens E4 and is at least partially in contact with the fourth lens E4. The fifth spacing element P5 is provided on the image-side surface of the fifth lens E5 and is at least partially in contact with the fifth lens E5. In this embodiment, the second spacing element P2, the third spacing element P3, the fourth spacing element P4 and the fifth spacing element P5 are spacers. The spacing elements P2-P5 can block the entry of excess light from the outside, make the lenses better supported against the lens barrels, and enhance the structural stability of the optical imaging systems 1002 and 1003.

In this example, effective focal lengths f of the optical imaging systems 1001, 1002 and 1003 are 6.69 mm. Halves of diagonal lengths ImgH of effective pixel areas on the image planes of the optical imaging systems 1001, 1002 and 1003 are 6.33 mm. Maximal fields-of-view FOV of the optical imaging systems 1001, 1002 and 1003 are 85.6°. The ratios f/EPD of the effective focal lengths f of the optical imaging systems 1001, 1002 and 1003 to entrance pupil diameters EPD of the optical imaging systems 1001, 1002 and 1003 are 1.61.

Table 1 is a table showing basic parameters of the imaging lens groups of the optical imaging systems 1001, 1002 and 1003 in Embodiment 1. Here, the units of a radius of curvature, a thickness and an effective focal length are millimeters (mm).

TABLE 1

| | | | | Material | | | Effective |
|---|---|---|---|---|---|---|---|
| Surface number | Surface type | Radius of curvature | Thickness | Refractive index | Abbe number | Conic coefficient | focal length |
| OBJ | spherical | infinite | 3399.0000 | | | | |
| STO | spherical | infinite | −0.8626 | | | | |
| S1 | aspheric | 2.8272 | 1.1363 | 1.50 | 81.6 | −0.0572 | 7.81 |
| S2 | aspheric | 8.9582 | 0.1552 | | | −22.2884 | |
| S3 | aspheric | 6.7380 | 0.3423 | 1.67 | 20.4 | 4.3414 | −88.76 |
| S4 | aspheric | 5.9252 | 0.5949 | | | −4.0962 | |
| S5 | aspheric | 27.1475 | 0.3200 | 1.67 | 19.2 | 64.6891 | −20.66 |
| S6 | aspheric | 9.1809 | 0.0557 | | | −1.0000 | |
| S7 | aspheric | 17.8133 | 0.6465 | 1.55 | 55.9 | −33.9926 | 27.85 |
| S8 | aspheric | −101.8810 | 0.3750 | | | 80.0000 | |
| S9 | aspheric | 71.7455 | 0.4791 | 1.57 | 38.0 | 80.0000 | −21.25 |
| S10 | aspheric | 10.3270 | 0.2200 | | | 3.8009 | |
| S11 | aspheric | 3.4516 | 0.6767 | 1.55 | 55.9 | 0.0000 | 6.09 |
| S12 | aspheric | −82.6396 | 1.5354 | | | 0.0000 | |
| S13 | aspheric | −32.3230 | 0.7121 | 1.54 | 55.9 | −69.6028 | −4.89 |
| S14 | aspheric | 2.8734 | 0.3245 | | | −1.0052 | |
| S15 | spherical | infinite | 0.1337 | 1.52 | 64.2 | | |
| S16 | spherical | infinite | 0.4357 | | | | |
| S17 | spherical | infinite | | | | | |

In Embodiment 1, the object-side surface and the image-side surface of any lens in the first to seventh lenses E1-E7 are both aspheric surfaces, and the surface type x of each aspheric lens may be defined using, but not limited to, the following formula:

$$x = \frac{ch^2}{1 + \sqrt{1 - (k + 1)c^2h^2}} + \Sigma Aih^i. \tag{1}$$

Here, x is the sag—the axis-component of the displacement of the surface from the aspheric vertex, when the surface is at height h from the optical axis; c is the paraxial curvature of the aspheric surface, and c=1/R (i.e., the paraxial curvature c is the reciprocal of the radius of curvature R in Table 1 above); k is the conic coefficient; and Ai is the correction coefficient of an i-th order of the aspheric surface. Tables 2-1 and 2-2 below shows the high-order coefficients $A_4$, $A_6$, $A_8$, $A_{10}$, $A_{12}$, $A_{14}$, $A_{16}$, $A_{18}$, $A_{20}$, $A_{22}$, $A_{24}$, $A_{26}$, $A_{28}$ and $A_{30}$ applicable to the aspheric surfaces S1-S14 in Embodiment 1.

TABLE 2-1

| Surface number | A4 | A6 | A8 | A10 | A12 | A14 | A16 |
|---|---|---|---|---|---|---|---|
| S1 | −4.4148E−03 | 1.0743E−02 | −1.4010E−02 | 1.1006E−02 | −5.4289E−03 | 1.6966E−03 | −3.2659E−04 |
| S2 | −3.2259E−03 | −1.2204E−02 | 2.3250E−02 | −2.1106E−02 | 1.1658E−02 | −4.0455E−03 | 8.5796E−04 |
| S3 | −2.4086E−02 | 5.3246E−02 | −2.0960E−01 | 5.3249E−01 | −8.7216E−01 | 9.7756E−01 | −7.7546E−01 |
| S4 | −3.9267E−03 | −6.5629E−03 | 1.8930E−02 | −2.1141E−02 | 1.5647E−02 | −8.2675E−03 | 3.1387E−03 |

TABLE 2-1-continued

| Surface number | A4 | A6 | A8 | A10 | A12 | A14 | A16 |
|---|---|---|---|---|---|---|---|
| S5 | −2.4987E−02 | 2.6175E−02 | −2.5027E−01 | 1.0452E+00 | −2.5282E+00 | 3.9543E+00 | −4.2327E+00 |
| S6 | −4.0878E−02 | −1.4196E−02 | 1.8155E−01 | −4.8714E−01 | 7.4835E−01 | −7.5608E−01 | 5.2699E−01 |
| S7 | −3.0850E−02 | −2.8891E−02 | 2.2376E−01 | −5.6945E−01 | 8.7235E−01 | −8.9534E−01 | 6.4236E−01 |
| S8 | −2.2923E−02 | 6.5605E−03 | 5.3936E−02 | −2.1919E−01 | 4.1164E−01 | −4.7615E−01 | 3.7029E−01 |
| S9 | −2.8149E−02 | 2.3155E−02 | −1.0123E−02 | −9.9903E−03 | 1.9151E−02 | −1.5139E−02 | 7.2745E−03 |
| S10 | −9.0658E−02 | 7.6173E−02 | −6.8679E−02 | 4.8925E−02 | −2.5747E−02 | 9.8520E−03 | −2.7203E−03 |
| S11 | −5.8877E−02 | 3.3471E−02 | −2.5596E−02 | 1.5117E−02 | −7.7668E−03 | 3.4529E−03 | −1.2374E−03 |
| S12 | 9.3768E−03 | −1.9531E−03 | −1.0460E−04 | −1.4425E−03 | 1.1185E−03 | −3.9376E−04 | 7.8413E−05 |
| S13 | −7.0038E−02 | 2.8352E−02 | −1.0239E−02 | 2.8391E−03 | −5.8930E−04 | 9.4333E−05 | −1.1671E−05 |
| S14 | −7.9307E−02 | 3.1499E−02 | −1.0223E−02 | 2.4457E−03 | −4.2721E−04 | 5.4774E−05 | −5.1851E−06 |

TABLE 2-2

| Surface number | A18 | A20 | A22 | A24 | A26 | A28 | A30 |
|---|---|---|---|---|---|---|---|
| S1 | 3.5342E−05 | −1.6488E−06 | 0.0000E+00 | 0.0000E+00 | 0.0000E+00 | 0.0000E+00 | 0.0000E+00 |
| S2 | −1.0135E−04 | 5.0933E−06 | 0.0000E+00 | 0.0000E+00 | 0.0000E+00 | 0.0000E+00 | 0.0000E+00 |
| S3 | 4.4253E−01 | −1.8226E−01 | 5.3660E−02 | −1.1006E−02 | 1.4928E−03 | −1.2026E−04 | 4.3540E−06 |
| S4 | −8.1405E−04 | 1.2775E−04 | −8.9786E−06 | 0.0000E+00 | 0.0000E+00 | 0.0000E+00 | 0.0000E+00 |
| S5 | 3.1908E+00 | −1.7119E+00 | 6.5045E−01 | −1.7109E−01 | 2.9634E−02 | −3.0404E−03 | 1.3998E−04 |
| S6 | −2.5787E−01 | 8.8467E−02 | −2.0848E−02 | 3.2146E−03 | −2.9203E−04 | 1.1846E−05 | 0.0000E+00 |
| S7 | −3.2839E−01 | 1.2016E−01 | −3.1185E−02 | 5.5923E−03 | −6.5719E−04 | 4.5398E−05 | −1.3926E−06 |
| S8 | −2.0108E−01 | 7.7337E−02 | −2.1001E−02 | 3.9397E−03 | −4.8592E−04 | 3.5457E−05 | −1.1597E−06 |
| S9 | −2.2935E−03 | 4.7841E−04 | −6.3702E−05 | 4.9041E−06 | −1.6592E−07 | 0.0000E+00 | 0.0000E+00 |
| S10 | 5.3252E−04 | −7.1457E−05 | 6.2058E−06 | −3.1268E−07 | 6.9193E−09 | 0.0000E+00 | 0.0000E+00 |
| S11 | 3.3666E−04 | −6.7301E−05 | 9.6552E−06 | −9.6291E−07 | 6.3157E−08 | −2.4422E−09 | 4.2090E−11 |
| S12 | −8.6421E−06 | 3.0729E−07 | 4.9726E−08 | −8.2206E−09 | 5.6002E−10 | −1.9392E−11 | 2.7961E−13 |
| S13 | 1.0963E−06 | −7.6456E−08 | 3.8635E−09 | −1.3685E−10 | 3.2151E−12 | −4.4951E−14 | 2.8295E−16 |
| S14 | 3.6312E−07 | −1.8727E−08 | 7.0119E−10 | −1.8522E−11 | 3.2699E−13 | −3.4602E−15 | 1.6589E−17 |

Tables 3-1, 3-2 and 3-3 are tables respectively showing structural parameters of the lens barrel structures, the imaging lens groups and the spacing elements of the optical imaging systems 1001, 1002 and 1003 in Embodiment 1. The units of the parameters in Tables 3-1, 3-2 and 3-3 are millimeters (mm).

TABLE 3-1

| d2s | D2s | d3s | D3s | ds | D0s | EP02 | CP2 | EP23 | EP34 |
|---|---|---|---|---|---|---|---|---|---|
| 3.60 | 6.00 | 3.90 | 6.30 | 4.20 | 7.16 | 1.01 | 0.02 | 0.53 | 0.38 |
| **EP45** | **L** | **DP1** | **DP6** | **DP7** | **L1** | **L2** | **B01** | **B02** | **EP022** |
| 0.66 | 7.05 | 5.32 | 9.30 | 12.10 | 1.30 | 3.13 | 0.93 | 1.49 | 0.32 |

TABLE 3-2

| d2s | D2s | d3s | D3s | ds | D0s | EP02 | CP2 | EP23 | EP34 |
|---|---|---|---|---|---|---|---|---|---|
| 3.60 | 6.00 | 3.90 | 6.30 | 4.20 | 7.16 | 1.01 | 0.02 | 0.53 | 0.38 |
| **EP45** | **L** | **DP1** | **DP6** | **DP7** | **L1** | **L2** | **B01** | **B02** | **EP022** |
| 0.66 | 5.03 | 5.32 | 9.30 | 12.10 | 1.30 | 3.66 | 0.93 | 1.49 | 0.32 |

TABLE 3-3

| d2s | D2s | d3s | D3s | ds | D0s | EP02 | CP2 | EP23 | EP34 |
|---|---|---|---|---|---|---|---|---|---|
| 3.60 | 5.00 | 3.90 | 6.10 | 4.20 | 7.16 | 1.07 | 0.02 | 0.53 | 0.28 |
| **EP45** | **L** | **DP1** | **DP6** | **DP7** | **L1** | **L2** | **B01** | **B02** | **EP022** |
| 0.54 | 5.03 | 5.72 | 8.70 | 12.10 | 1.30 | 3.66 | 0.73 | 1.49 | 0.32 |

Figure 3A:
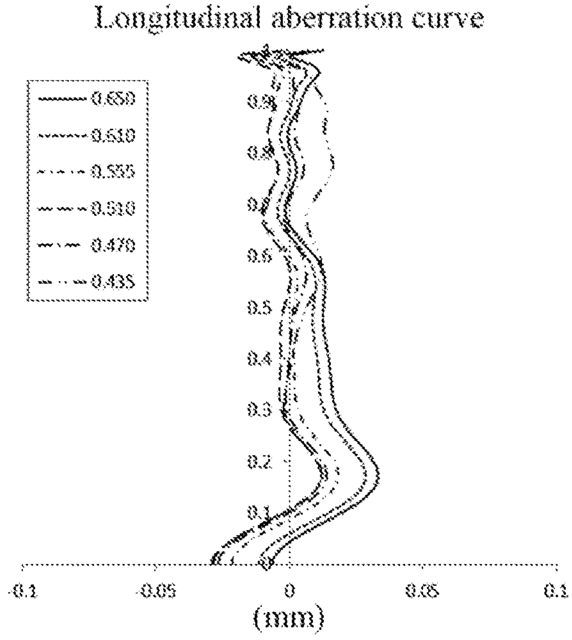
FIGS. 3A-3C respectively show longitudinal aberration curves, astigmatic curves and distortion curves of the optical imaging systems according to Embodiment 1 of the present disclosure.
Figure 3B:
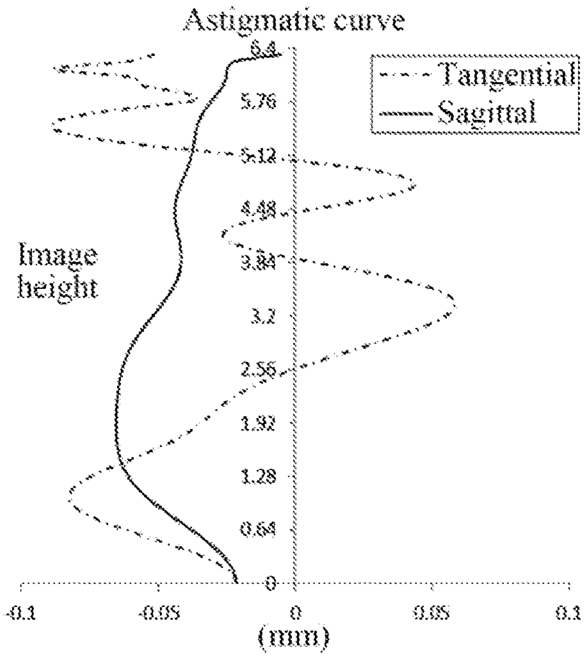
Figure 3C:
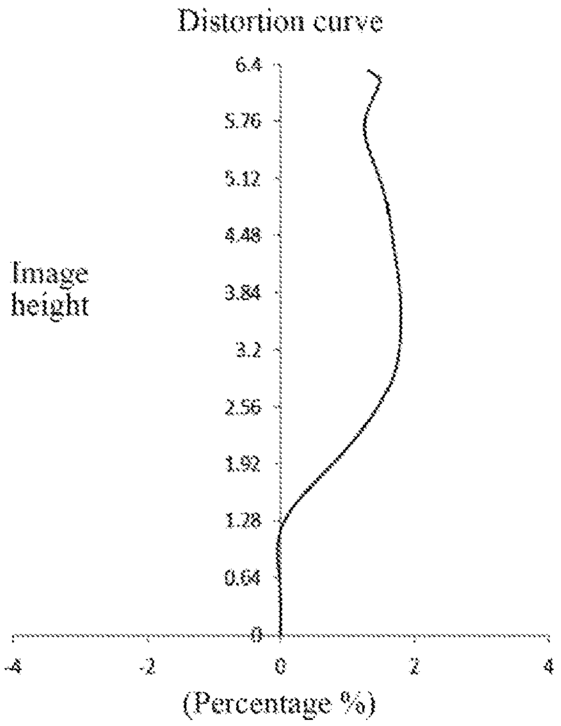

FIG. 3A illustrates longitudinal aberration curves of the optical imaging systems 1001, 1002 and 1003 in Embodiment 1, representing deviations of focal points of light of different wavelengths converged after passing through a lens assembly. FIG. 3B illustrates astigmatic curves of the optical imaging systems 1001, 1002 and 1003 in Embodiment 1, representing a curvature of a tangential image plane and a curvature of a sagittal image plane. FIG. 3C illustrates distortion curves of the optical imaging systems 1001, 1002 and 1003 in Embodiment 1, representing amounts of distortion corresponding to different image heights. It can be seen from FIGS. 3A-3C that the optical imaging systems 1001, 1002 and 1003 given in Embodiment 1 can achieve a good imaging quality.

Embodiment 2

Figure 4A:
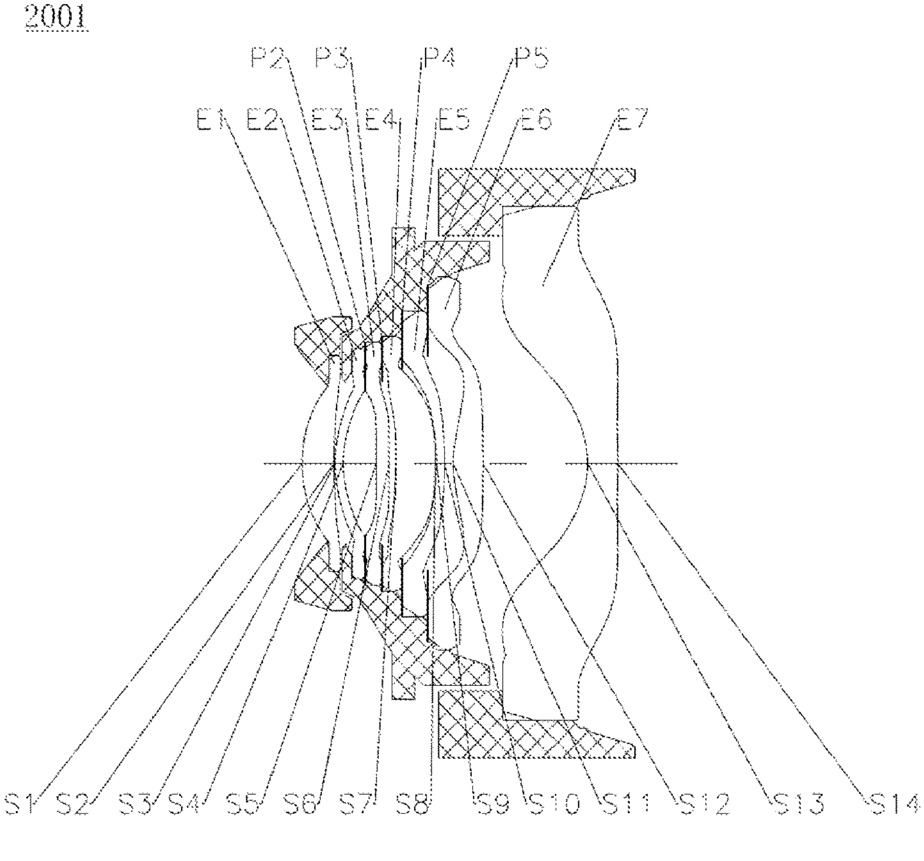
FIGS. 4A-4C are schematic structural diagrams of three optical imaging systems according to Embodiment 2 of the present disclosure.
Figure 4B:
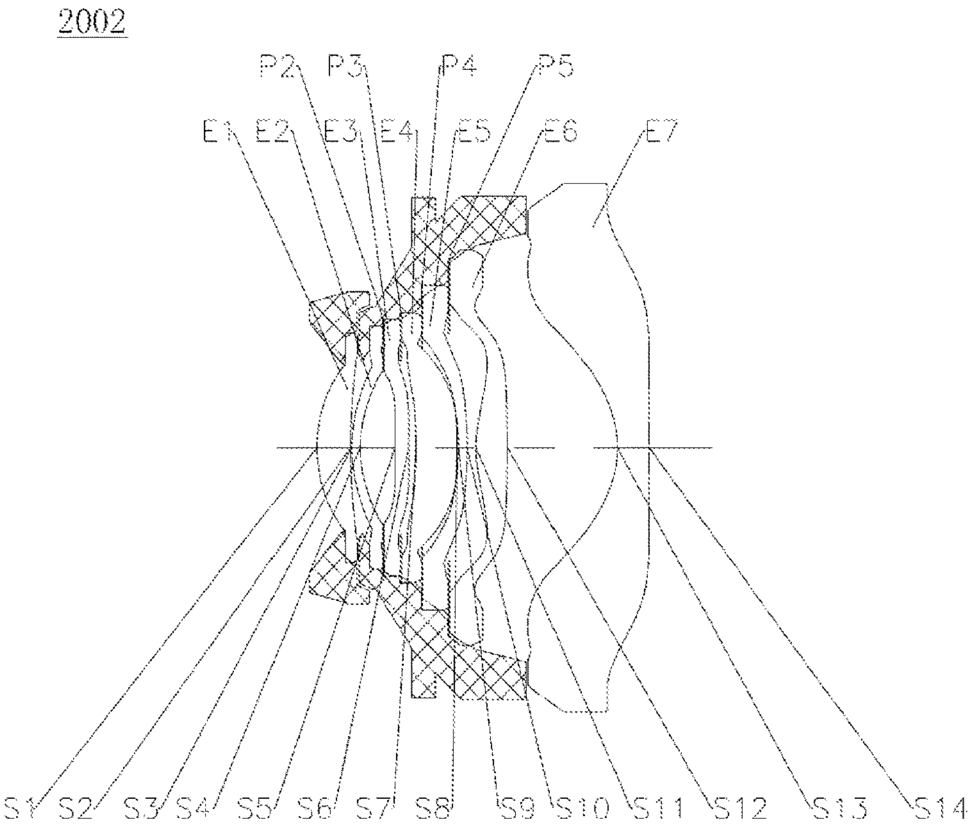
Figure 4C:
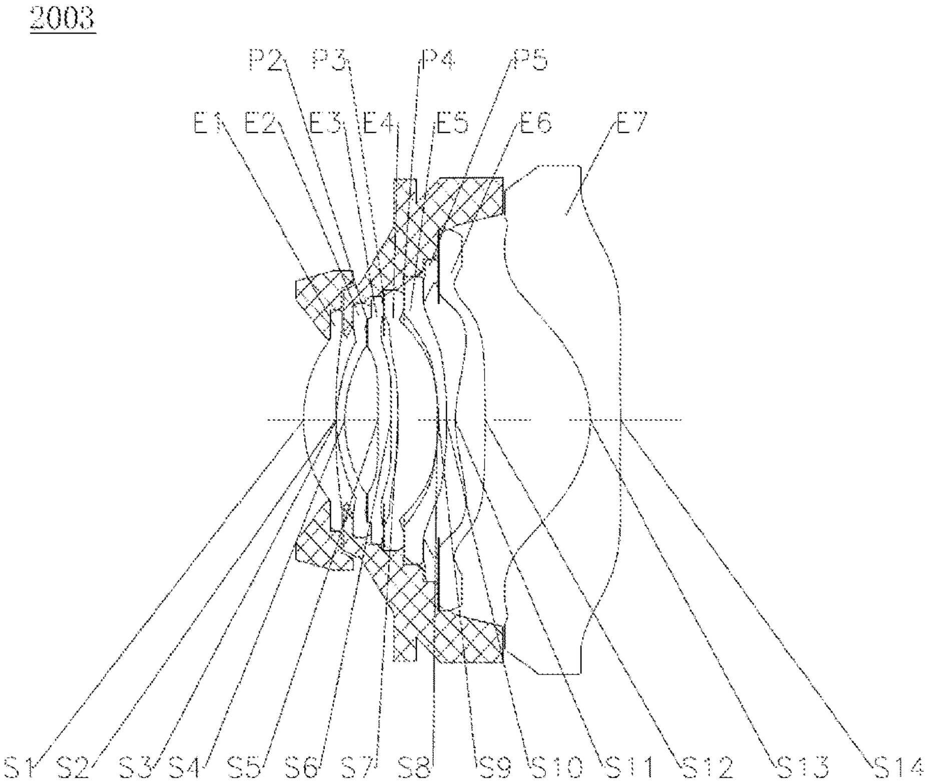

Optical imaging systems 2001, 2002 and 2003 according to Embodiment 2 of the present disclosure are described below with reference to FIGS. 4A-5C. In this embodiment and the following embodiments, for the sake of brevity, some descriptions similar to those in Embodiment 1 will be omitted. FIGS. 4A-4C are respectively schematic structural diagrams of the optical imaging systems 2001, 2002 and 2003 according to Embodiment 2 of the present disclosure.

As shown in FIGS. 4A-4C, the optical imaging systems 2001, 2002 and 2003 respectively include a lens barrel structure, an imaging lens group and a plurality of spacing elements. Here, the lens barrel structure of the optical imaging system 2001 shown in FIG. 4A includes three lens barrels, which are respectively a first lens barrel closest to an object side, a second lens barrel, and a third lens barrel closest to an image side. The second lens barrel is located between the first lens barrel and the third lens barrel, the first lens barrel and the second lens barrel form a bonding structure, and the second lens barrel and the third lens barrel form a bonding structure. The lens barrel structure of the optical imaging system 2002 shown in FIG. 4B and the lens barrel structure of the optical imaging system 2003 shown in FIG. 4C include two lens barrels, which are respectively a first lens barrel closest to the object side and a second lens barrel closest to the image side. The first lens barrel and the second lens barrel form a bonding structure.

As shown in FIGS. 4A-4C, the optical imaging systems 2001, 2002 and 2003 adopt the same imaging lens group. The imaging lens groups of the optical imaging systems 2001, 2002 and 2003 respectively include a diaphragm STO (not shown), a first lens E1, a second lens E2, a third lens E3, a fourth lens E4, a fifth lens E5, a sixth lens E6 and a seventh lens E7 that are arranged in sequence along an optical axis from the object side to the image side. Here, the first lens E1 has a positive refractive power, an object-side surface S1 of the first lens E1 is a convex surface, and an image-side surface S2 of the first lens E1 is a concave surface. The second lens E2 has a negative refractive power, an object-side surface S3 of the second lens E2 is a convex surface, and an image-side surface S4 of the second lens E2 is a concave surface. The third lens E3 has a negative refractive power, an object-side surface S5 of the third lens E3 is a convex surface, and an image-side surface S6 of the third lens E3 is a concave surface. The fourth lens E4 has a negative refractive power, an object-side surface S7 of the fourth lens E4 is a concave surface, and an image-side surface S8 of the fourth lens E4 is a concave surface. The fifth lens E5 has a negative refractive power, an object-side surface S9 of the fifth lens E5 is a concave surface, and an image-side surface S10 of the fifth lens E5 is a convex surface. The sixth lens E6 has a positive refractive power, an object-side surface S11 of the sixth lens E6 is a convex surface, and an image-side surface S12 of the sixth lens E6 is a convex surface. The seventh lens E7 has a negative refractive power, an object-side surface S13 of the seventh lens E7 is a concave surface, and an image-side surface S14 of the seventh lens E7 is a convex surface. Light from an object sequentially passes through the first to seventh lenses E1-E7 along the direction of a first optical axis, and finally forms an image on an image plane (not shown).

As shown in FIGS. 4A-4C, the optical imaging systems 2001, 2002 and 2003 adopt the same spacing elements, including a second spacing element P2, a third spacing element P3, a fourth spacing element P4 and a fifth spacing element P5. Here, the second spacing element P2 is provided on the image-side surface of the second lens E2 and is at least partially in contact with the second lens E2. The third spacing element P3 is provided on the image-side surface of the third lens E3 and is at least partially in contact with the third lens E3. The fourth spacing element P4 is provided on the image-side surface of the fourth lens E4 and is at least partially in contact with the fourth lens E4. The fifth spacing element P5 is provided on the image-side surface of the fifth lens E5 and is at least partially in contact with the fifth lens E5. In this embodiment, the second spacing element P2, the third spacing element P3, the fourth spacing element P4 and the fifth spacing element P5 are spacers. The above spacing elements P2-P5 can block the entry of excess light from the outside, make the lenses better supported against the lens barrels, and enhance the structural stability of the optical imaging systems 2001, 2002 and 2003.

In this example, effective focal lengths f of the optical imaging systems 2001, 2002 and 2003 are 6.20 mm. Halves of diagonal lengths ImgH of effective pixel areas on the image planes of the optical imaging systems 2001, 2002 and 2003 are 6.22 mm. Maximal fields-of-view FOV of the optical imaging systems 2001, 2002 and 2003 are 88.5°. The ratios f/EPD of the effective focal lengths f of the optical imaging systems 2001, 2002 and 2003 to entrance pupil diameters EPD of the optical imaging systems 2001, 2002 and 2003 are 1.57.

Table 4 is a table showing basic parameters of the imaging lens groups of the optical imaging systems 2001, 2002 and 2003 in Embodiment 2. Here, the units of a radius of curvature, a thickness and an effective focal length are millimeters (mm). Tables 5-1 and 5-2 show the high-order coefficients applicable to the aspheric surfaces in Embodiment 2. Here, the surface type of each aspheric surface may be defined using the formula (1) given in Embodiment 1.

TABLE 4

| | | | | Material | | | Effective |
|---|---|---|---|---|---|---|---|
| Surface number | Surface type | Radius of curvature | Thickness | Refractive index | Abbe number | Conic coefficient | focal length |
| OBJ | spherical | infinite | 3000.0000 | | | | |
| STO | spherical | infinite | −0.6724 | | | | |
| S1 | aspheric | 3.3832 | 0.8500 | 1.50 | 81.6 | −0.0007 | 9.39 |
| S2 | aspheric | 11.1866 | 0.0285 | | | 0.0577 | |
| S3 | aspheric | 3.1537 | 0.2150 | 1.67 | 19.2 | −0.0003 | −79.14 |
| S4 | aspheric | 2.8965 | 0.8796 | | | 0.0002 | |
| S5 | aspheric | 47.9354 | 0.3452 | 1.55 | 55.9 | 0.0000 | −171.98 |
| S6 | aspheric | 31.6447 | 0.1885 | | | 0.0000 | |
| S7 | aspheric | −34.6169 | 1.0364 | 1.55 | 55.9 | 0.0000 | −59.88 |
| S8 | aspheric | 586.1363 | 0.0382 | | | 0.0000 | |
| S9 | aspheric | −7.7584 | 0.2150 | 1.67 | 19.2 | 0.0000 | −15.44 |
| S10 | aspheric | −30.3389 | 0.2292 | | | −0.2646 | |
| S11 | aspheric | 2.6820 | 0.7925 | 1.55 | 55.9 | −1.0000 | 4.6 |
| S12 | aspheric | −34.8652 | 2.6135 | | | 0.0000 | |
| S13 | aspheric | −2.4470 | 0.8053 | 1.54 | 55.9 | −1.0098 | −6.38 |
| S14 | aspheric | −9.5273 | 0.0402 | | | 0.0000 | |
| S15 | spherical | infinite | 0.0718 | 1.52 | 64.2 | | |
| S16 | spherical | infinite | 0.0711 | | | | |
| S17 | spherical | infinite | | | | | |

TABLE 5-1

| Surface number | A4 | A6 | A8 | A10 | A12 | A14 | A16 |
|---|---|---|---|---|---|---|---|
| S1 | 4.4990E−03 | −5.9021E−03 | 7.8902E−03 | −6.4650E−03 | 3.3481E−03 | −1.0835E−03 | 2.1150E−04 |
| S2 | −1.6139E−02 | 6.7169E−03 | 3.0095E−03 | −4.9955E−03 | 2.6921E−03 | −7.4550E−04 | 1.0082E−04 |
| S3 | −6.7418E−03 | −6.7188E−02 | 1.6196E−01 | −2.4075E−01 | 2.4316E−01 | −1.6997E−01 | 8.2748E−02 |
| S4 | −3.0483E−03 | −2.5663E−02 | 2.3970E−02 | 6.9223E−03 | −4.9079E−02 | 6.8357E−02 | −5.3746E−02 |
| S5 | −1.0248E−02 | −1.0429E−02 | 2.6071E−03 | 6.1170E−03 | −1.1161E−02 | 8.3347E−03 | −3.5247E−03 |
| S6 | −3.2847E−02 | 4.1593E−02 | −1.0012E−01 | 1.5746E−01 | −1.7087E−01 | 1.3168E−01 | −7.3640E−02 |
| S7 | −5.1476E−02 | 8.1187E−02 | −1.5107E−01 | 1.8659E−01 | −1.4746E−01 | 7.6719E−02 | −2.6806E−02 |
| S8 | −1.4835E−01 | 1.8163E−01 | −1.9319E−01 | 1.4715E−01 | −7.7338E−02 | 2.7596E−02 | −6.6050E−03 |
| S9 | −1.5763E−01 | 3.2976E−01 | −3.8484E−01 | 2.9433E−01 | −1.5454E−01 | 5.6162E−02 | −1.4124E−02 |
| S10 | −1.2729E−01 | 2.1114E−01 | −2.0066E−01 | 1.2455E−01 | −5.3177E−02 | 1.5690E−02 | −3.1458E−03 |
| S11 | −1.0021E−01 | 7.7460E−02 | −4.9960E−02 | 2.3039E−02 | −7.5539E−03 | 1.7629E−03 | −2.9388E−04 |
| S12 | 1.0411E−02 | −1.7621E−02 | 1.7145E−02 | −1.1035E−02 | 4.6848E−03 | −1.3489E−03 | 2.6634E−04 |
| S13 | 1.1040E−02 | −7.2463E−03 | 3.0540E−03 | −9.2648E−04 | 1.9725E−04 | −2.9171E−05 | 3.0378E−06 |
| S14 | 6.1313E−02 | −3.6485E−02 | 1.3686E−02 | −3.4335E−03 | 5.9580E−04 | −7.3378E−05 | 6.5238E−06 |

TABLE 5-2

| Surface number | A18 | A20 | A22 | A24 | A26 | A28 | A30 |
|---|---|---|---|---|---|---|---|
| S1 | −2.2566E−05 | 9.9622E−07 | 0.0000E+00 | 0.0000E+00 | 0.0000E+00 | 0.0000E+00 | 0.0000E+00 |
| S2 | −3.7305E−06 | −3.0214E−07 | 0.0000E+00 | 0.0000E+00 | 0.0000E+00 | 0.0000E+00 | 0.0000E+00 |
| S3 | −2.7910E−02 | 6.3831E−03 | −9.4320E−04 | 8.1162E−05 | −3.0875E−06 | 0.0000E+00 | 0.0000E+00 |
| S4 | 2.6853E−02 | −8.6860E−03 | 1.7649E−03 | −2.0499E−04 | 1.0389E−05 | 0.0000E+00 | 0.0000E+00 |
| S5 | 9.0192E−04 | −1.3167E−04 | 8.4404E−06 | 0.0000E+00 | 0.0000E+00 | 0.0000E+00 | 0.0000E+00 |
| S6 | 2.9937E−02 | −8.6905E−03 | 1.7411E−03 | −2.2732E−04 | 1.7339E−05 | −5.8468E−07 | 0.0000E+00 |
| S7 | 6.3310E−03 | −9.9842E−04 | 1.0089E−04 | −5.9169E−06 | 1.5341E−07 | 0.0000E+00 | 0.0000E+00 |
| S8 | 1.0378E−03 | −1.0215E−04 | 5.6771E−06 | −1.3484E−07 | 0.0000E+00 | 0.0000E+00 | 0.0000E+00 |
| S9 | 2.4370E−03 | −2.8182E−04 | 2.0778E−05 | −8.7890E−07 | 1.6169E−08 | 0.0000E+00 | 0.0000E+00 |
| S10 | 4.0828E−04 | −2.9557E−05 | 3.6802E−07 | 1.2481E−07 | −9.8811E−09 | 2.4705E−10 | 0.0000E+00 |
| S11 | 3.4904E−05 | −2.9022E−06 | 1.6131E−07 | −5.3884E−09 | 8.1526E−11 | 0.0000E+00 | 0.0000E+00 |
| S12 | −3.5954E−05 | 3.2519E−06 | −1.8800E−07 | 6.2691E−09 | −9.1633E−11 | 0.0000E+00 | 0.0000E+00 |
| S13 | −2.2422E−07 | 1.1646E−08 | −4.1551E−10 | 9.6836E−12 | −1.3264E−13 | 8.0957E−16 | 0.0000E+00 |
| S14 | −4.2226E−07 | 1.9887E−08 | −6.7373E−10 | 1.5985E−11 | −2.5200E−13 | 2.3703E−15 | −1.0064E−17 |

Tables 6-1, 6-2 and 6-3 are tables respectively showing structural parameters of the lens barrel structures, the imaging lens groups and the spacing elements of the optical imaging systems 2001, 2002 and 2003 in Embodiment 2. The units of the parameters in Tables 6-1, 6-2 and 6-3 are millimeters (mm).

TABLE 6-1

| d2s | D2s | d3s | D3s | ds | D0s | EP02 | CP2 | EP23 | EP34 |
|---|---|---|---|---|---|---|---|---|---|
| 3.66 | 6.20 | 4.18 | 6.50 | 4.00 | 6.96 | 0.96 | 0.02 | 0.43 | 0.51 |
| EP45 | L | DP1 | DP6 | DP7 | L1 | L2 | B01 | B02 | EP022 |
| 0.65 | 9.06 | 5.52 | 9.50 | 13.10 | 1.52 | 3.93 | 0.28 | 1.18 | 0.35 |

TABLE 6-2

| d2s | D2s | d3s | D3s | ds | D0s | EP02 | CP2 | EP23 | EP34 |
|---|---|---|---|---|---|---|---|---|---|
| 3.66 | 6.20 | 4.18 | 6.50 | 4.00 | 6.96 | 0.96 | 0.02 | 0.43 | 0.51 |
| EP45 | L | DP1 | DP6 | DP7 | L1 | L2 | B01 | B02 | EP022 |
| 0.65 | 5.49 | 5.52 | 9.50 | 12.70 | 1.52 | 4.23 | 0.28 | 1.18 | 0.35 |

TABLE 6-3

| d2s | D2s | d3s | D3s | ds | D0s | EP02 | CP2 | EP23 | EP34 |
|---|---|---|---|---|---|---|---|---|---|
| 3.66 | 5.66 | 4.18 | 6.50 | 4.01 | 6.95 | 0.96 | 0.02 | 0.43 | 0.51 |
| EP45 | L | DP1 | DP6 | DP7 | L1 | L2 | B01 | B02 | EP022 |
| 0.50 | 5.49 | 5.52 | 9.50 | 12.70 | 1.52 | 4.23 | 0.28 | 1.13 | 0.35 |

Figure 5A:
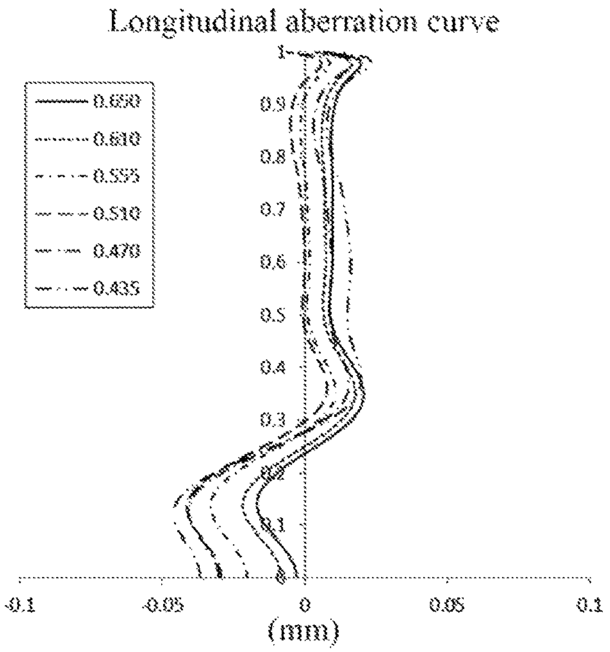
FIGS. 5A-5C respectively show longitudinal aberration curves, astigmatic curves and distortion curves of the optical imaging systems according to Embodiment 2 of the present disclosure.
Figure 5B:
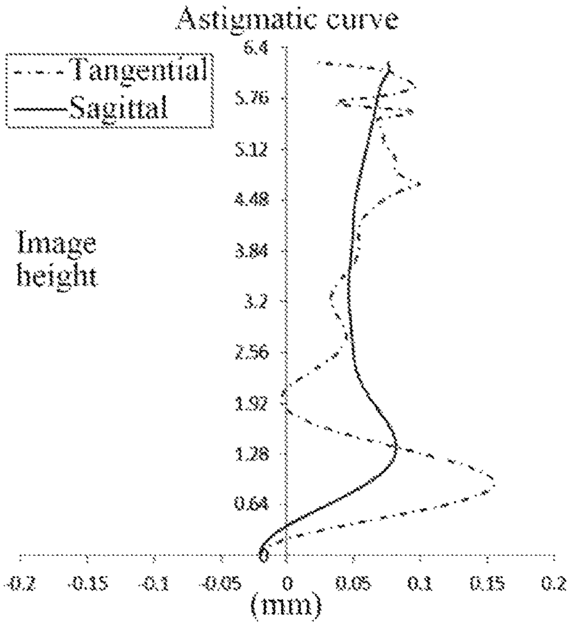
Figure 5C:
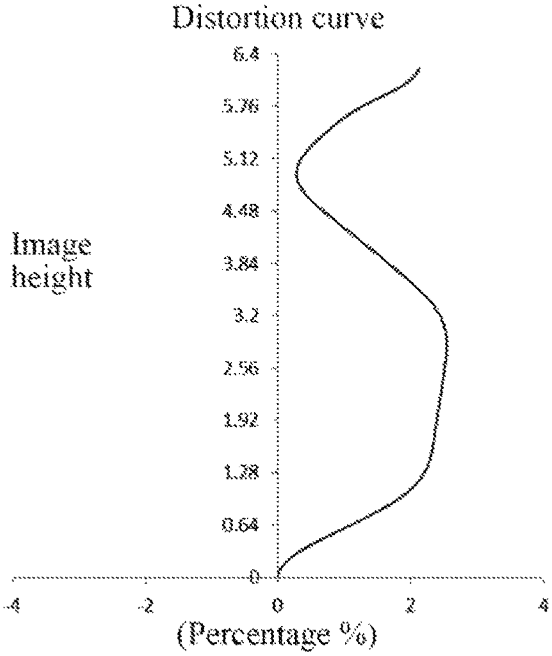

FIG. 5A illustrates longitudinal aberration curves of the optical imaging systems 2001, 2002 and 2003 in Embodiment 2, representing deviations of focal points of light of different wavelengths converged after passing through a lens assembly. FIG. 5B illustrates astigmatic curves of the optical imaging systems 2001, 2002 and 2003 in Embodiment 2, representing a curvature of a tangential image plane and a curvature of a sagittal image plane. FIG. 5C illustrates distortion curves of the optical imaging systems 2001, 2002 and 2003 in Embodiment 2, representing amounts of distortion corresponding to different image heights. It can be seen from FIGS. 5A-5C that the optical imaging systems 2001, 2002 and 2003 given in Embodiment 2 can achieve a good imaging quality.

Embodiment 3

Figure 6:
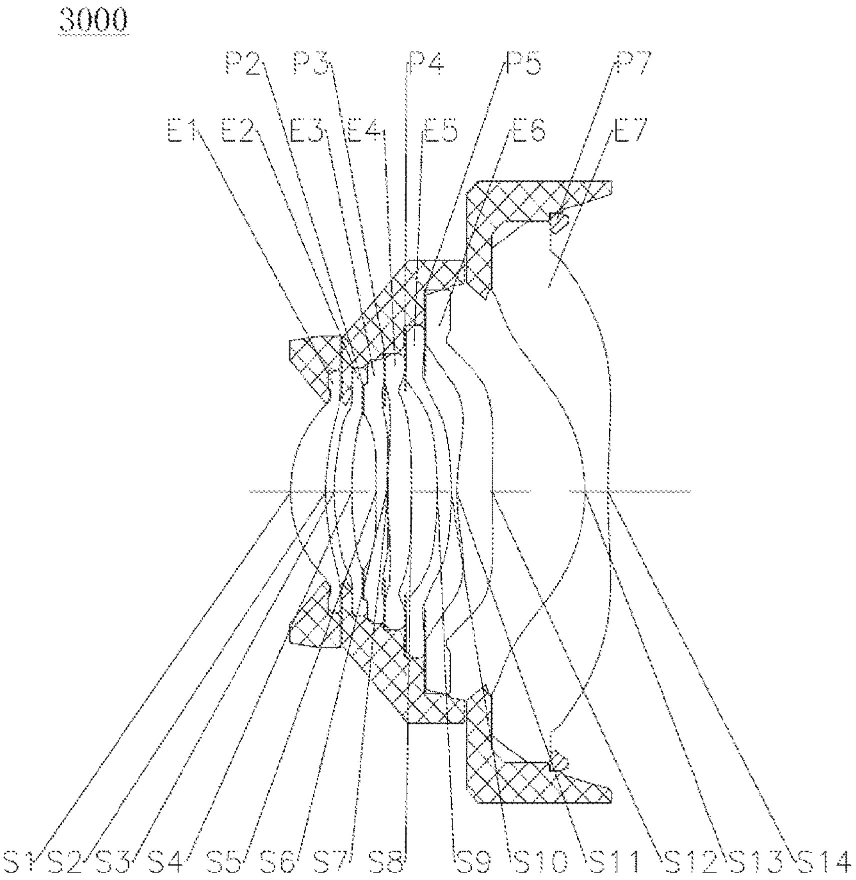
FIG. 6 is a schematic structural diagram of an optical imaging system according to Embodiment 3 of the present disclosure.

An optical imaging system 3000 according to Embodiment 3 of the present disclosure is described below with reference to FIGS. 6-7C. FIG. 6 is a schematic structural diagram of the optical imaging system 3000 according to Embodiment 3 of the present disclosure.

As shown in FIG. 6, the optical imaging system 3000 includes a lens barrel structure, an imaging lens group and a plurality of spacing elements. Here, the lens barrel structure of the optical imaging system 3000 includes three lens barrels, which are respectively a first lens barrel closest to an object side, a second lens barrel, and a third lens barrel closest to an image side. The second lens barrel is located between the first lens barrel and the third lens barrel, there is a gap between the first lens barrel and the second lens barrel, and there is also a gap between the second lens barrel and the third lens barrel.

As shown in FIG. 6, the imaging lens group of the optical imaging system 3000 includes a diaphragm STO (not shown), a first lens E1, a second lens E2, a third lens E3, a fourth lens E4, a fifth lens E5, a sixth lens E6 and a seventh lens E7 that are arranged in sequence along an optical axis from the object side to the image side. Here, the first lens E1 has a positive refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a negative refractive power, an object-side surface S5 of the third lens E3 is a concave surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a convex surface. The fifth lens E5 has a negative refractive power, an object-side surface S9 of the fifth lens E5 is a concave surface, and an image-side surface S10 of the fifth lens E5 is a convex surface. The sixth lens E6 has a positive refractive power, an object-side surface S11 of the sixth lens E6 is a convex surface, and an image-side surface S12 of the sixth lens E6 is a concave surface. The seventh lens E7 has a negative refractive power, an object-side surface S13 of the seventh lens E7 is a concave surface, and an image-side surface S14 of the seventh lens E7 is a concave surface. Light from an object sequentially passes through the first to seventh lenses E1-E7 along the direction of a first optical axis, and finally forms an image on an image plane (not shown).

As shown in FIG. 6, the spacing elements of the optical imaging system 3000 include a second spacing element P2, a third spacing element P3, a fourth spacing element P4, a fifth spacing element P5 and a seventh spacing element P7. Here, the second spacing element P2 is provided on the image-side surface of the second lens E2 and is at least partially in contact with the second lens E2. The third spacing element P3 is provided on the image-side surface of the third lens E3 and is at least partially in contact with the third lens E3. The fourth spacing element P4 is provided on the image-side surface of the fourth lens E4 and is at least partially in contact with the fourth lens E4. The fifth spacing element P5 is provided on the image-side surface of the fifth lens E5 and is at least partially in contact with the fifth lens E5. The seventh spacing element P7 is provided on the image-side surface e of the seventh lens E7 and is at least partially in contact with the seventh lens E7. In this embodiment, the second spacing element P2, the third spacing element P3, the fourth spacing element P4 and the fifth spacing element P5 are spacers, and the seventh spacing element P7 is a press ring. The above spacing elements P2-P5 and P7 can block the entry of excess light from the outside, make the lenses better supported against the lens barrels, and enhance the structural stability of the optical imaging system 3000.

In this example, an effective focal length f of the optical imaging system 3000 is 6.60 mm. Half of a diagonal length ImgH of an effective pixel area on the image plane of the optical imaging system 3000 is 6.33 mm. A maximal field-of-view FOV of the optical imaging system 3000 is 86.3°. The ratio f/EPD of the effective focal length f of the optical imaging system 3000 to an entrance pupil diameter EPD of the optical imaging system 3000 is 1.60.

Table 7 is a table showing basic parameters of the imaging lens group of the optical imaging system 3000 in Embodiment 3. Here, the units of a radius of curvature, a thickness and an effective focal length are millimeters (mm). Tables 8-1 and 8-2 show the high-order coefficients applicable to the aspheric surfaces in Embodiment 3. Here, the surface type of each aspheric surface may be defined using the formula (1) given in Embodiment 1.

TABLE 7

| | | | | Material | | | Effective |
|---|---|---|---|---|---|---|---|
| Surface number | Surface type | Radius of curvature | Thickness | Refractive index | Abbe number | Conic coefficient | focal length |
| OBJ | spherical | infinite | 3000.0000 | | | | |
| STO | spherical | infinite | −0.8975 | | | | |
| S1 | aspheric | 2.8157 | 0.8748 | 1.50 | 81.6 | 0.0000 | 12.44 |
| S2 | aspheric | 4.6271 | 0.2162 | | | 0.0000 | |
| S3 | aspheric | 4.4706 | 0.4310 | 1.55 | 55.9 | 0.0000 | 24.64 |
| S4 | aspheric | 6.4700 | 0.6206 | | | 0.0000 | |
| S5 | aspheric | −348.8761 | 0.2549 | 1.67 | 19.2 | 0.0000 | −21.75 |
| S6 | aspheric | 15.3893 | 0.0314 | | | 0.0000 | |
| S7 | aspheric | 21.7895 | 0.6032 | 1.55 | 55.9 | 0.0000 | 22.91 |
| S8 | aspheric | −29.0177 | 0.6486 | | | 0.0000 | |
| S9 | aspheric | −6.3278 | 0.3406 | 1.67 | 20.4 | 0.0000 | −32.72 |
| S10 | aspheric | −9.1069 | 0.1449 | | | 0.0000 | |
| S11 | aspheric | 4.1701 | 0.8866 | 1.57 | 38.0 | −0.4172 | 7.96 |
| S12 | aspheric | 47.5190 | 2.3101 | | | 0.0000 | |
| S13 | aspheric | −3.7649 | 0.5771 | 1.62 | 25.9 | −1.0000 | −4.83 |
| S14 | aspheric | 15.3883 | 0.0946 | | | 0.0000 | |
| S15 | spherical | infinite | 0.1260 | 1.52 | 64.2 | | |
| S16 | spherical | infinite | 0.1260 | | | | |
| S17 | spherical | infinite | | | | | |

TABLE 8-1

| Surface number | A4 | A6 | A8 | A10 | A12 | A14 | A16 |
|---|---|---|---|---|---|---|---|
| S1 | 1.2484E−04 | −1.6634E−03 | 3.1496E−03 | −2.7888E−03 | 1.4021E−03 | −4.0386E−04 | 6.2050E−05 |
| S2 | −1.0629E−02 | 3.4799E−03 | −5.3822E−03 | 4.4585E−03 | −2.0724E−03 | 5.5124E−04 | −7.5222E−05 |
| S3 | −1.7606E−02 | 1.4002E−02 | −2.2940E−02 | 1.3325E−02 | 1.0304E−02 | −2.4226E−02 | 2.0401E−02 |
| S4 | 8.3473E−03 | −7.5662E−02 | 2.3583E−01 | −4.6365E−01 | 6.0362E−01 | −5.3704E−01 | 3.3191E−01 |
| S5 | −4.5773E−03 | −4.6783E−02 | 3.7827E−02 | 5.5283E−02 | −2.0312E−01 | 2.9387E−01 | −2.6392E−01 |
| S6 | 6.3792E−02 | −1.6099E−01 | 1.2624E−01 | 5.6865E−02 | −2.2507E−01 | 2.3656E−01 | −1.4230E−01 |
| S7 | 8.0576E−02 | −1.6222E−01 | 1.2977E−01 | 2.8972E−02 | −1.6463E−01 | 1.7165E−01 | −1.0100E−01 |
| S8 | −3.0790E−04 | −1.1685E−02 | 2.0356E−02 | −4.1882E−02 | 5.7710E−02 | −5.0412E−02 | 2.9163E−02 |
| S9 | 4.2923E−02 | −2.8448E−02 | 3.0857E−03 | 1.2122E−02 | −1.3997E−02 | 8.2724E−03 | −3.0687E−03 |
| S10 | 1.2423E−02 | −2.2228E−02 | 1.4628E−02 | −6.1175E−03 | 8.5857E−04 | 5.8888E−04 | −4.5315E−04 |
| S11 | −3.1919E−02 | 7.4571E−03 | −7.9069E−03 | 9.6252E−03 | −8.0928E−03 | 4.4822E−03 | −1.6868E−03 |
| S12 | −2.7972E−05 | 1.8586E−03 | −5.5786E−03 | 4.5826E−03 | −2.3516E−03 | 8.1476E−04 | −1.9478E−04 |
| S13 | −1.0715E−02 | 1.2080E−02 | −8.0266E−03 | 3.1205E−03 | −7.9605E−04 | 1.4049E−04 | −1.7527E−05 |
| S14 | −1.4869E−02 | 9.3027E−03 | −3.9663E−03 | 1.0625E−03 | −1.9255E−04 | 2.4592E−05 | −2.2657E−06 |

TABLE 8-2

| Surface number | A18 | A20 | A22 | A24 | A26 | A28 | A30 |
|---|---|---|---|---|---|---|---|
| S1 | −3.9464E−06 | 0.0000E+00 | 0.0000E+00 | 0.0000E+00 | 0.0000E+00 | 0.0000E+00 | 0.0000E+00 |
| S2 | 3.9030E−06 | 0.0000E+00 | 0.0000E+00 | 0.0000E+00 | 0.0000E+00 | 0.0000E+00 | 0.0000E+00 |
| S3 | −9.9691E−03 | 3.0517E−03 | −5.7852E−04 | 6.2290E−05 | −2.9190E−06 | 0.0000E+00 | 0.0000E+00 |
| S4 | −1.4244E−01 | 4.1635E−02 | −7.9083E−03 | 8.8022E−04 | −4.3588E−05 | 0.0000E+00 | 0.0000E+00 |
| S5 | 1.6093E−01 | −6.7934E−02 | 1.9577E−02 | −3.6769E−03 | 4.0565E−04 | −1.9940E−05 | 0.0000E+00 |
| S6 | 5.4944E−02 | −1.3896E−02 | 2.2345E−03 | −2.0784E−04 | 8.5293E−06 | 0.0000E+00 | 0.0000E+00 |
| S7 | 3.8493E−02 | −9.8397E−03 | 1.6756E−03 | −1.8196E−04 | 1.1348E−05 | −3.0711E−07 | 0.0000E+00 |
| S8 | −1.1490E−02 | 3.1031E−03 | −5.6572E−04 | 6.6535E−05 | −4.5557E−06 | 1.3787E−07 | 0.0000E+00 |
| S9 | 7.4925E−04 | −1.2017E−04 | 1.2175E−05 | −7.0602E−07 | 1.7869E−08 | 0.0000E+00 | 0.0000E+00 |
| S10 | 1.7206E−04 | −4.4212E−05 | 8.1254E−06 | −1.0494E−06 | 8.9606E−08 | −4.4981E−09 | 9.9868E−11 |
| S11 | 4.4203E−04 | −8.1436E−05 | 1.0491E−05 | −9.2384E−07 | 5.2907E−08 | −1.7740E−09 | 2.6411E−11 |
| S12 | 3.2259E−05 | −3.6523E−06 | 2.7144E−07 | −1.1974E−08 | 2.2119E−10 | 3.0591E−12 | −1.4785E−13 |
| S13 | 1.5571E−06 | −9.8180E−08 | 4.3251E−09 | −1.2866E−10 | 2.4198E−12 | −2.5159E−14 | 1.0253E−16 |
| S14 | 1.5224E−07 | −7.4608E−09 | 2.6353E−10 | −6.5257E−12 | 1.0737E−13 | −1.0530E−15 | 4.6537E−18 |

Table 9 is a table showing structural parameters of the lens barrel structure, the imaging lens group and the spacing elements of the optical imaging system 3000 in Embodiment 3. The units of the parameters in Table 9 are millimeters (mm).

TABLE 9

| d2s | D2s | d3s | D3s | ds | D0s | EP02 | CP2 | EP23 | EP34 |
|---|---|---|---|---|---|---|---|---|---|
| 3.56 | 5.01 | 4.02 | 6.50 | 4.14 | 7.10 | 0.86 | 0.02 | 0.52 | 0.49 |
| EP45 | L | DP1 | DP6 | DP7 | L1 | L2 | B01 | B02 | EP022 |
| 0.48 | 8.04 | 5.71 | 9.50 | 12.70 | 1.28 | 3.07 | 0.73 | 1.59 | 0.26 |

Figure 7A:
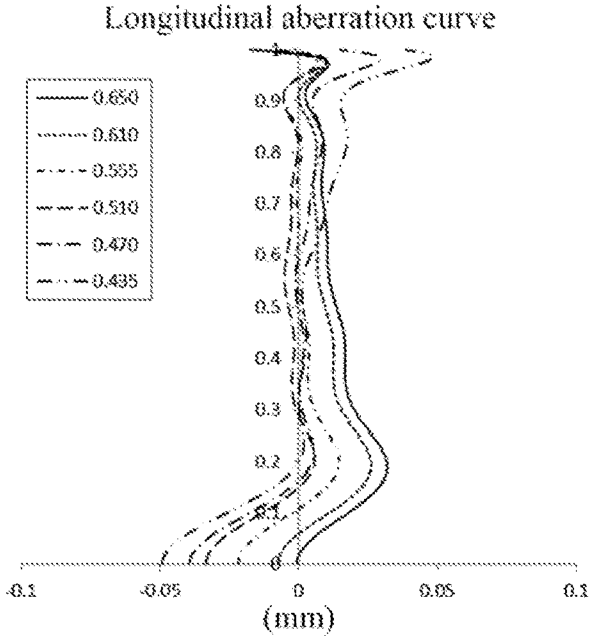
FIGS. 7A-7C show a longitudinal aberration curve, an astigmatic curve and a distortion curve of the optical imaging system according to Embodiment 3 of the present disclosure.
Figure 7B:
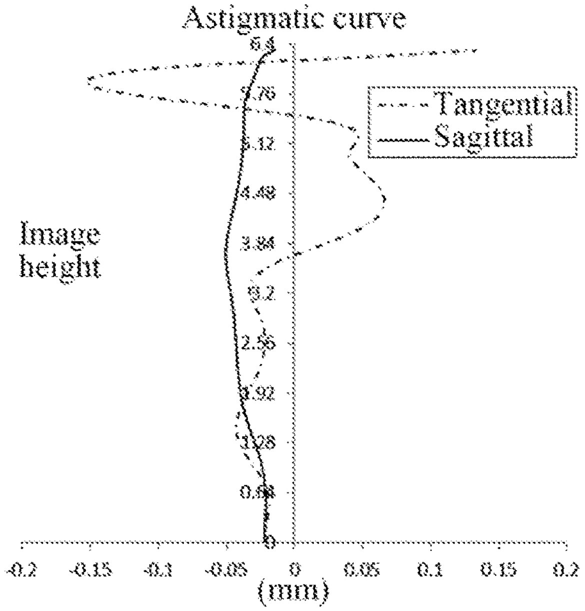
Figure 7C:
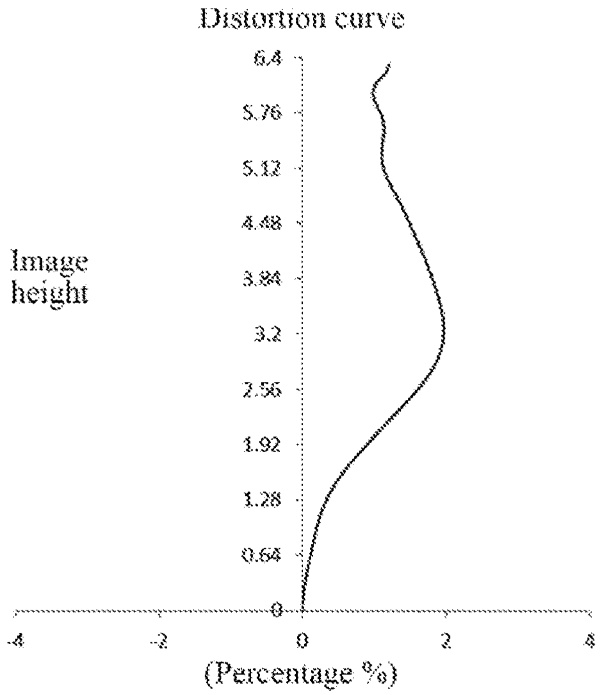

FIG. 7A illustrates a longitudinal aberration curve of the optical imaging system 3000 in Embodiment 3, representing deviations of focal points of light of different wavelengths converged after passing through a lens assembly. FIG. 7B illustrates an astigmatic curve of the optical imaging system 3000 in Embodiment 3, representing a curvature of a tangential image plane and a curvature of a sagittal image plane. FIG. 7C illustrates a distortion curve of the optical imaging system 3000 in Embodiment 3, representing amounts of distortion corresponding to different image heights. It can be seen from FIGS. 7A-7C that the optical imaging system 3000 in Embodiment 3 can achieve a good imaging quality.

Embodiment 4

Figure 8:
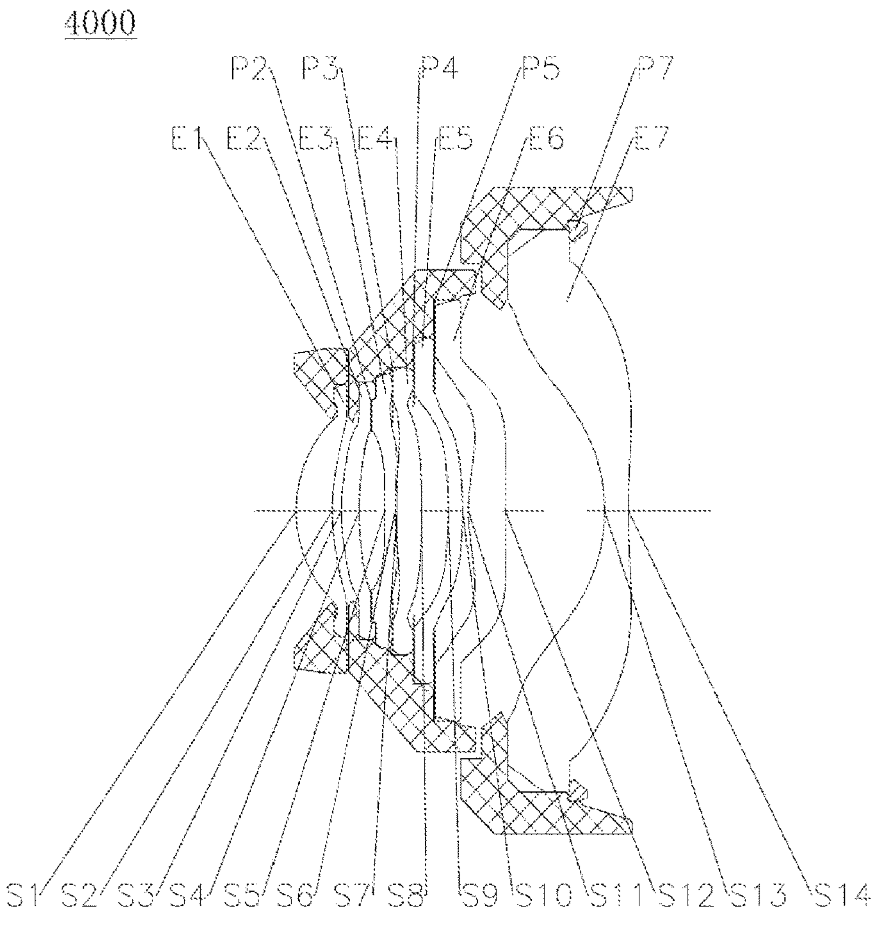
FIG. 8 is a schematic structural diagram of an optical imaging system according to Embodiment 4 of the present disclosure.

An optical imaging system 4000 according to Embodiment 4 of the present disclosure is described below with reference to FIGS. 8-9C. FIG. 8 is a schematic structural diagram of the optical imaging system 4000 according to Embodiment 4 of the present disclosure.

As shown in FIG. 8, the optical imaging system 4000 includes a lens barrel structure, an imaging lens group and a plurality of spacing elements. Here, the lens barrel structure of the optical imaging system 4000 includes three lens barrels, which are respectively a first lens barrel closest to an object side, a second lens barrel, and a third lens barrel closest to an image side. The second lens barrel is located between the first lens barrel and the third lens barrel, there is a gap between the first lens barrel and the second lens barrel, and the second lens barrel and the third lens barrel form a bonding structure.

As shown in FIG. 8, the imaging lens group of the optical imaging system 4000 includes a diaphragm STO (not shown), a first lens E1, a second lens E2, a third lens E3, a fourth lens E4, a fifth lens E5, a sixth lens E6 and a seventh lens E7 that are arranged in sequence along an optical axis from the object side to the image side. Here, the first lens E1 has a positive refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a negative refractive power, an object-side surface S5 of the third lens E3 is a concave surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a convex surface. The fifth lens E5 has a negative refractive power, an object-side surface S9 of the fifth lens E5 is a concave surface, and an image-side surface S10 of the fifth lens E5 is a convex surface. The sixth lens E6 has a positive refractive power, an object-side surface S11 of the sixth lens E6 is a convex surface, and an image-side surface S12 of the sixth lens E6 is a concave surface. The seventh lens E7 has a negative refractive power, an object-side surface S13 of the seventh lens E7 is a concave surface, and an image-side surface S14 of the seventh lens E7 is a concave surface. Light from an object sequentially passes through the first to seventh lenses E1-E7 along the direction of a first optical axis, and finally forms an image on an image plane (not shown).

As shown in FIG. 8, the spacing elements of the optical imaging system 4000 include a second spacing element P2, a third spacing element P3, a fourth spacing element P4, a fifth spacing element P5 and a seventh spacing element P7. Here, the second spacing element P2 is provided on the image-side surface of the second lens E2 and is at least partially in contact with the second lens E2. The third spacing element P3 is provided on the image-side surface of the third lens E3 and is at least partially in contact with the third lens E3. The fourth spacing element P4 is provided on the image-side surface of the fourth lens E4 and is at least partially in contact with the fourth lens E4. The fifth spacing element P5 is provided on the image-side surface of the fifth lens E5 and is at least partially in contact with the fifth lens E5. The seventh spacing element P7 is provided on the image-side surface of the seventh lens E7 and is at least partially in contact with the seventh lens E7. In this embodiment, the second spacing element P2, the third spacing element P3, the fourth spacing element P4 and the fifth spacing element P5 are spacers, and the seventh spacing element P7 is a press ring. The above spacing elements P2-P5 and P7 can block the entry of excess light from the outside, make the lenses better supported against the lens barrels, and enhance the structural stability of the optical imaging system 4000.

In this example, an effective focal length f of the optical imaging system 4000 is 6.60 mm. Half of a diagonal length ImgH of an effective pixel area on the image plane of the optical imaging system 4000 is 6.33 mm. A maximal field-of-view FOV of the optical imaging system 4000 is 86.3°. The ratio f/EPD of the effective focal length f of the optical imaging system 4000 to an entrance pupil diameter EPD of the optical imaging system 4000 is 1.60.

Table 10 is a table showing basic parameters of the imaging lens group of the optical imaging system 4000 in Embodiment 4. Here, the units of a radius of curvature, a thickness and an effective focal length are millimeters (mm). Tables 11-1 and 11-2 show the high-order coefficients applicable to the aspheric surfaces in Embodiment 4. Here, the surface type of each aspheric surface may be defined using the formula (1) given in Embodiment 1.

TABLE 10

| Surface number | Surface type | Radius of curvature | Thickness | Material: Refractive index | Material: Abbe number | Conic coefficient | Effective focal length |
|---|---|---|---|---|---|---|---|
| OBJ | spherical | infinite | 400.0000 | | | | |
| STO | spherical | infinite | −0.8975 | | | | |
| S1 | aspheric | 2.8157 | 0.8748 | 1.50 | 81.6 | 0.0000 | 12.44 |
| S2 | aspheric | 4.6271 | 0.2162 | | | 0.0000 | |
| S3 | aspheric | 4.4706 | 0.4310 | 1.55 | 55.9 | 0.0000 | 24.64 |
| S4 | aspheric | 6.4700 | 0.6206 | | | 0.0000 | |
| S5 | aspheric | −348.8761 | 0.2549 | 1.67 | 19.2 | 0.0000 | −21.75 |
| S6 | aspheric | 15.3893 | 0.0314 | | | 0.0000 | |
| S7 | aspheric | 21.7895 | 0.6032 | 1.55 | 55.9 | 0.0000 | 22.91 |
| S8 | aspheric | −29.0177 | 0.6486 | | | 0.0000 | |
| S9 | aspheric | −6.3278 | 0.3406 | 1.67 | 20.4 | 0.0000 | −32.72 |
| S10 | aspheric | −9.1069 | 0.1449 | | | 0.0000 | |
| S11 | aspheric | 4.1701 | 0.8866 | 1.57 | 38.0 | −0.4172 | 7.96 |
| S12 | aspheric | 47.5190 | 2.3848 | | | 0.0000 | |
| S13 | aspheric | −3.7649 | 0.5771 | 1.62 | 25.9 | −1.0000 | −4.83 |
| S14 | aspheric | 15.3883 | 0.0946 | | | 0.0000 | |
| S15 | spherical | infinite | 0.1260 | 1.52 | 64.2 | | |
| S16 | spherical | infinite | 0.1260 | | | | |
| S17 | spherical | infinite | | | | | |

TABLE 11-1

| Surface number | A4 | A6 | A8 | A10 | A12 | A14 | A16 |
|---|---|---|---|---|---|---|---|
| S1 | 1.2484E−04 | −1.6634E−03 | 3.1496E−03 | −2.7888E−03 | 1.4021E−03 | −4.0386E−04 | 6.2050E−05 |
| S2 | −1.0629E−02 | 3.4799E−03 | −5.3822E−03 | 4.4585E−03 | −2.0724E−03 | 5.5124E−04 | −7.5222E−05 |
| S3 | −1.7606E−02 | 1.4002E−02 | −2.2940E−02 | 1.3325E−02 | 1.0304E−02 | −2.4226E−02 | 2.0401E−02 |
| S4 | 8.3473E−03 | −7.5662E−02 | 2.3583E−01 | −4.6365E−01 | 6.0362E−01 | −5.3704E−01 | 3.3191E−01 |
| S5 | −4.5773E−03 | −4.6783E−02 | 3.7827E−02 | 5.5283E−02 | −2.0312E−01 | 2.9387E−01 | −2.6392E−01 |
| S6 | 6.3792E−02 | −1.6099E−01 | 1.2624E−01 | 5.6865E−02 | −2.2507E−01 | 2.3656E−01 | −1.4230E−01 |
| S7 | 8.0576E−02 | −1.6222E−01 | 1.2977E−01 | 2.8972E−02 | −1.6463E−01 | 1.7165E−01 | −1.0100E−01 |
| S8 | −3.0790E−04 | −1.1685E−02 | 2.0356E−02 | −4.1882E−02 | 5.7710E−02 | −5.0412E−02 | 2.9163E−02 |
| S9 | 4.2923E−02 | −2.8448E−02 | 3.0857E−03 | 1.2122E−02 | −1.3997E−02 | 8.2724E−03 | −3.0687E−03 |
| S10 | 1.2423E−02 | −2.2228E−02 | 1.4628E−02 | −6.1175E−03 | 8.5857E−04 | 5.8888E−04 | −4.5315E−04 |
| S11 | −3.1919E−02 | 7.4571E−03 | −7.9069E−03 | 9.6252E−03 | −8.0928E−03 | 4.4822E−03 | −1.6868E−03 |
| S12 | −2.7972E−05 | 1.8586E−03 | −5.5786E−03 | 4.5826E−03 | −2.3516E−03 | 8.1476E−04 | −1.9478E−04 |
| S13 | −1.0715E−02 | 1.2080E−02 | −8.0266E−03 | 3.1205E−03 | −7.9605E−04 | 1.4049E−04 | −1.7527E−05 |
| S14 | −1.4869E−02 | 9.3027E−03 | −3.9663E−03 | 1.0625E−03 | −1.9255E−04 | 2.4592E−05 | −2.2657E−06 |

TABLE 11-2

| Surface number | A18 | A20 | A22 | A24 | A26 | A28 | A30 |
|---|---|---|---|---|---|---|---|
| S1 | −3.9464E−06 | 0.0000E+00 | 0.0000E+00 | 0.0000E+00 | 0.0000E+00 | 0.0000E+00 | 0.0000E+00 |
| S2 | 3.9030E−06 | 0.0000E+00 | 0.0000E+00 | 0.0000E+00 | 0.0000E+00 | 0.0000E+00 | 0.0000E+00 |
| S3 | −9.9691E−03 | 3.0517E−03 | −5.7852E−04 | 6.2290E−05 | −2.9190E−06 | 0.0000E+00 | 0.0000E+00 |
| S4 | −1.4244E−01 | 4.1635E−02 | −7.9083E−03 | 8.8022E−04 | −4.3588E−05 | 0.0000E+00 | 0.0000E+00 |
| S5 | 1.6093E−01 | −6.7934E−02 | 1.9577E−02 | −3.6769E−03 | 4.0565E−04 | −1.9940E−05 | 0.0000E+00 |
| S6 | 5.4944E−02 | −1.3896E−02 | 2.2345E−03 | −2.0784E−04 | 8.5293E−06 | 0.0000E+00 | 0.0000E+00 |
| S7 | 3.8493E−02 | −9.8397E−03 | 1.6756E−03 | −1.8196E−04 | 1.1348E−05 | −3.0711E−07 | 0.0000E+00 |
| S8 | −1.1490E−02 | 3.1031E−03 | −5.6572E−04 | 6.6535E−05 | −4.5557E−06 | 1.3787E−07 | 0.0000E+00 |
| S9 | 7.4925E−04 | −1.2017E−04 | 1.2175E−05 | −7.0602E−07 | 1.7869E−08 | 0.0000E+00 | 0.0000E+00 |
| S10 | 1.7206E−04 | −4.4212E−05 | 8.1254E−06 | −1.0494E−06 | 8.9606E−08 | −4.4981E−09 | 9.9868E−11 |
| S11 | 4.4203E−04 | −8.1436E−05 | 1.0491E−05 | −9.2384E−07 | 5.2907E−08 | −1.7740E−09 | 2.6411E−11 |
| S12 | 3.2259E−05 | −3.6523E−06 | 2.7144E−07 | −1.1974E−08 | 2.2119E−10 | 3.0591E−12 | −1.4785E−13 |
| S13 | 1.5571E−06 | −9.8180E−08 | 4.3251E−09 | −1.2866E−10 | 2.4198E−12 | −2.5159E−14 | 1.0253E−16 |
| S14 | 1.5224E−07 | −7.4608E−09 | 2.6353E−10 | −6.5257E−12 | 1.0737E−13 | −1.0530E−15 | 4.6537E−18 |

Table 12 is a table showing structural parameters of the lens barrel structure, the imaging lens group and the spacing elements of the optical imaging system 4000 in Embodiment 4. The units of the parameters in Table 12 are millimeters (mm).

TABLE 12

| d2s | D2s | d3s | D3s | ds | D0s | EP02 | CP2 | EP23 | EP34 |
|---|---|---|---|---|---|---|---|---|---|
| 3.56 | 5.01 | 4.02 | 6.50 | 4.14 | 7.10 | 0.89 | 0.02 | 0.49 | 0.48 |
| EP45 | L | DP1 | DP6 | DP7 | L1 | L2 | B01 | B02 | EP022 |
| 0.48 | 8.14 | 5.71 | 9.50 | 12.70 | 1.28 | 3.07 | 0.73 | 1.59 | 0.29 |

Figure 9A:
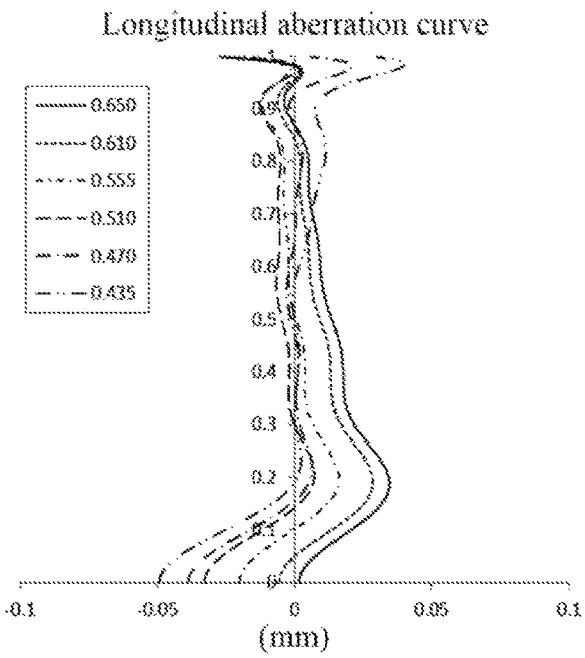
FIGS. 9A-9C respectively show a longitudinal aberration curve, an astigmatic curve and a distortion curve of the optical imaging system according to Embodiment 4 of the present disclosure.
Figure 9B:
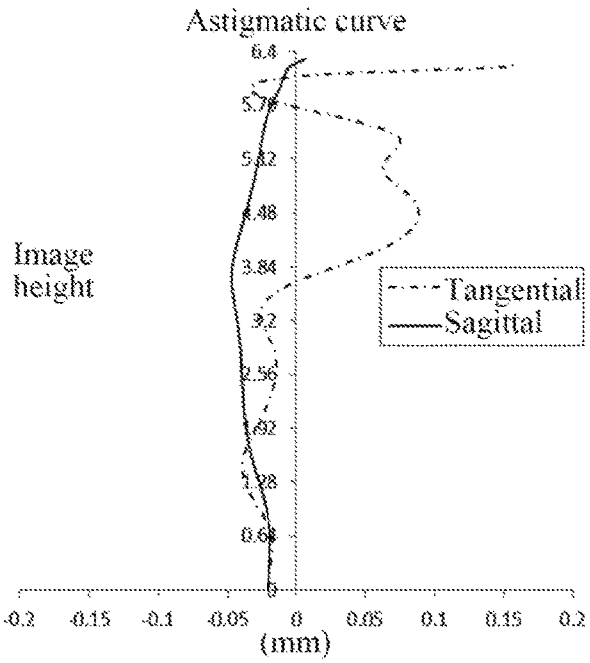
Figure 9C:
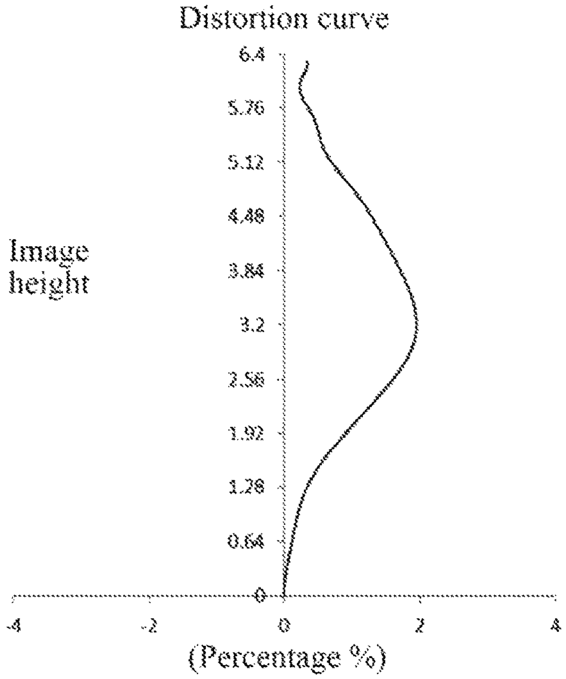

FIG. 9A illustrates a longitudinal aberration curve of the optical imaging system 4000 in Embodiment 4, representing deviations of focal points of light of different wavelengths converged after passing through a lens assembly. FIG. 9B illustrates an astigmatic curve of the optical imaging system 4000 in Embodiment 4, representing a curvature of a tangential image plane and a curvature of a sagittal image plane. FIG. 9C illustrates a distortion curve of the optical imaging system 4000 in Embodiment 4, representing amounts of distortion corresponding to different image heights. It can be seen from FIGS. 9A-9C that the optical imaging system 4000 in Embodiment 4 can achieve a good imaging quality.

In summary, the optical imaging systems 1001, 1002 and 1003 in Embodiment 1, the optical imaging systems 2001, 2002 and 2003 in Embodiment 2, the optical imaging system 3000 in Embodiment 3 and the optical imaging system 4000 in Embodiment 4 respectively satisfy the relationships shown in Table 13.

TABLE 13

| | Conditional expression/Optical imaging system | | | | | | | |
|---|---|---|---|---|---|---|---|---|
| | 1001 | 1002 | 1003 | 2001 | 2002 | 2003 | 3000 | 4000 |
| d3s/R3 + D3s/R4 + EP23/(T23 + CT3) | 2.22 | 2.22 | 2.19 | 3.92 | 3.92 | 3.92 | 2.50 | 2.46 |
| (D2s − d2s)/EP02 + CT1/CT2 | 5.70 | 5.70 | 4.63 | 6.61 | 6.61 | 6.04 | 3.72 | 3.66 |
| (D0s − ds)/(2 × L1)/(R1/R2) | 3.60 | 3.60 | 3.60 | 3.21 | 3.21 | 3.20 | 1.90 | 1.90 |
| B02/CT2 + CP2/EP022 | 4.41 | 4.41 | 4.41 | 5.54 | 5.54 | 5.31 | 3.75 | 3.74 |
| (CT1 + T12)/DP1 + B01/CT1 | 1.06 | 1.06 | 0.86 | 0.49 | 0.49 | 0.49 | 1.03 | 1.03 |
| (DP7 − DP6)/(T67 + CT7) | 1.25 | 1.25 | 1.51 | 1.05 | 0.94 | 0.94 | 1.11 | 1.08 |
| L2/L | 0.44 | 0.73 | 0.73 | 0.43 | 0.77 | 0.77 | 0.38 | 0.38 |
| EP34/CT4 + EP45/CT5 | 1.97 | 1.97 | 1.56 | 3.53 | 3.53 | 2.84 | 2.23 | 2.22 |
| (L1 + L2)/L | 0.63 | 0.99 | 0.99 | 0.60 | 1.05 | 1.05 | 0.54 | 0.53 |

The foregoing is only a description for the preferred embodiments of the present disclosure and the applied technical principles. It should be appreciated by those skilled in the art that the inventive scope of the present disclosure is not limited to the technical solution formed by the particular combination of the above technical features. The inventive scope should also cover other technical solutions formed by any combination of the above technical features or equivalent features thereof without departing from the concept of the present disclosure, for example, technical solutions formed by replacing the features disclosed in the present disclosure with (but not limited to) technical features with similar functions.

What is claimed is:

1. An optical imaging system, comprising:

a lens barrel structure, comprising a first lens barrel and a subsequent lens barrel that are arranged sequentially along an optical axis from an object side to an image side;

an imaging lens group, comprising a first lens, a second lens, a third lens, a fourth lens, a fifth lens, a sixth lens and a seventh lens that are arranged sequentially along the optical axis from the object side to the image side; and a plurality of spacing elements comprising a third spacing element that is at least partially in contact with an image-side surface of the third lens, a fourth spacing element that is at least partially in contact with an image-side surface of the fourth lens and a fifth spacing element that is at least partially in contact with an image-side surface of the fifth lens, wherein at least one lens in the imaging lens group is arranged in the first lens barrel, and a peripheral portion of the at least one lens in the imaging lens group is at least partially in contact with an inner wall of the lens barrel structure; and wherein a spacing EP34 between the third spacing element and the fourth spacing element along the optical axis, a spacing EP45 between the fourth spacing element and the fifth spacing element along the optical axis, a center thickness CT4 of the fourth lens on the optical axis and a center thickness CT5 of the fifth lens on the optical axis satisfy: ((EP34/CT4)+(EP45/CT5)) >0.5, wherein the sixth lens has a positive refractive power, and the seventh lens has a negative refractive power.

2. The optical imaging system according to claim 1, wherein each spacing element in the plurality of spacing elements has a first surface parallel to the optical axis and a second surface perpendicular to the optical axis, at least one first surface is at least partially in contact with the inner wall of the lens barrel structure, and at least one second surface is at least partially in contact with a lens in the imaging lens group.

3. The optical imaging system according to claim 1, wherein an object-side surface of the seventh lens is a concave surface, and the seventh lens and the sixth lens have opposite refractive powers.

4. The optical imaging system according to claim 1, wherein, in object-side surfaces and image-side surfaces of the first lens, the second lens and the third lens, at least two surfaces are convex surfaces, at least two surfaces are concave surfaces, and at least one image-side surface is a concave surface.

5. The optical imaging system according to claim 4, wherein the object-side surface of the second lens is a convex surface.

6. The optical imaging system according to claim 4, wherein the image-side surface of the third lens is a concave surface.

7. The optical imaging system according to claim 1, wherein the subsequent lens barrel is composed of one lens barrel or two lens barrels, a lens closest to the image side is arranged inside a lens barrel closest to the image side in the subsequent barrel, and a peripheral portion of an object-side surface of the lens closest to the image side is at least partially in contact with an inner wall of the lens barrel closest to the image side in the subsequent barrel.

8. The optical imaging system according to claim 1, wherein the subsequent lens barrel is composed of one lens barrel or two lens barrels, a lens closest to the image side is placed outside a lens barrel closest to the image side in the subsequent barrel, and a peripheral portion of an object-side surface of the lens closest to the image side is in connection with a rear-end surface of the lens barrel closest to the image side in the subsequent barrel by any one of glue, buckles or screw thread.

9. The optical imaging system according to claim 1, wherein the plurality of spacing elements further comprise: a second spacing element that is at least partially in contact with an image-side surface of the second lens, and wherein a center thickness CT1 of the first lens on the optical axis, a center thickness CT2 of the second lens on the optical axis, an outer diameter D2*s* of an object-side surface of the second spacing element, an inner diameter d2*s* of the object-side surface of the second spacing element and a spacing EP02 between an inner wall of the first lens barrel perpendicular to the optical axis and an object-side surface of the second spacing element on the optical axis satisfy: 1.0<(D2*s*−d2*s*)/EP02)+(CT1/CT2)<10.0.

10. The optical imaging system according to claim 1, wherein an outer diameter D0*s* of a front-end surface of the first lens barrel facing the object side, a minimal inner diameter ds of a front-end portion of the first lens barrel facing the object side, a length L1 from the front-end surface of the first lens barrel to a rear-end surface of the first lens barrel on the optical axis, a radius of curvature R1 of an object-side surface of the first lens and a radius of curvature R2 of an image-side surface of the first lens satisfy: (D0*s*−ds)/(2×L1)/(R1/R2)>0.5.

11. The optical imaging system according to claim 1, wherein the subsequent lens barrel at least comprises a second lens barrel close to the rear-end surface of the first lens barrel, and the plurality of spacing elements further comprise: a second spacing element that is at least partially in contact with an image-side surface of the second lens, and, wherein a radial distance B02 of a front-end surface of the second lens barrel perpendicular to the optical axis, a center thickness CT2 of the second lens on the optical axis, a maximal thickness CP2 of the second spacing element and a spacing EP022 between an inner wall of the second lens barrel perpendicular to the optical axis and the second spacing element along the optical axis satisfy: 1.0<(B02/CT2)+(CP2/EP022)<10.0.

12. The optical imaging system according to claim 1, wherein a center thickness CT1 of the first lens on the optical axis, an air spacing T12 between the first lens and the second lens on the optical axis, a maximal diameter DP1 of the first lens and a radial distance B01 of a rear-end surface of the first lens barrel in a direction perpendicular to the optical axis satisfy: (CT1+T12)/DP1)+(B01/CT1>0.3.

13. The optical imaging system according to claim 1, wherein a maximal diameter DP6 of the sixth lens, a maximal diameter DP7 of the seventh lens, an air spacing T67 between the sixth lens and the seventh lens on the optical axis and a center thickness CT7 of the seventh lens on the optical axis satisfy: (DP7−DP6)/(T67+CT7)>0.5.

14. The optical imaging system according to claim 1, wherein the subsequent lens barrel at least comprises a second lens barrel close to a rear-end surface of the first lens barrel, and a length L2 from a front-end surface of the second lens barrel to a rear-end surface of the second lens barrel along the optical axis and a maximal total length L of the lens barrel structure satisfy: L2/L>0.1.

15. The optical imaging system according to claim 1, wherein the plurality of spacing elements further comprise: a second spacing element that is at least partially in contact with an image-side surface of the second lens, and wherein an inner diameter d3*s* of an object-side surface of the third spacing element, an outer diameter D3*s* of the object-side surface of the third spacing element, a radius of curvature R3 of an object-side surface of the second lens, a radius of curvature R4 of the image-side surface of the second lens, a spacing EP23 between the second spacing element and the third spacing element along the optical axis, an air spacing T23 between the second lens and the third lens on the optical axis and a center thickness CT3 of the third lens on the optical axis satisfy: (d3*s*/R3)+(D3*s*/R4)+(EP23/(T23+CT3)) >1.0.

16. The optical imaging system according to claim 1, wherein the subsequent lens barrel at least comprises a second lens barrel close to a rear-end surface of the first lens barrel, and the rear-end surface of the first lens barrel and a front-end surface of the second lens barrel have a gap or form a bonding structure, wherein a length L1 from a front-end surface of the first lens barrel to the rear-end surface of the first lens barrel along the optical axis, a length L2 from the front-end surface of the second lens barrel to a rear-end surface of the second lens barrel along the optical axis and a maximal total length L of the lens barrel structure satisfy: $(L1+L2)/L>0.2$.

* * * * *